United States Patent [19]

August

[11] 4,191,032
[45] Mar. 4, 1980

[54] ROTARY ENERGY-TRANSMITTING MECHANISM

[76] Inventor: Daniel A. August, 7162 Crown West, Houston, Tex. 77072

[21] Appl. No.: 936,148

[22] Filed: Aug. 23, 1978

Related U.S. Application Data

[63] Continuation of Ser. No. 872,964, Jan. 27, 1978, abandoned.

[51] Int. Cl.² .......................... F16D 3/52; F16D 3/56; F16D 3/14
[52] U.S. Cl. .................................. 64/27 B; 64/27 R; 64/27 L; 64/15 B; 64/15 R
[58] Field of Search ................... 64/27 R, 27 B, 27 L, 64/15 B, 15 R

[56] References Cited

U.S. PATENT DOCUMENTS

| | | | |
|---|---|---|---|
| 1,602,298 | 10/1926 | Bethel | 64/27 L |
| 1,853,757 | 4/1932 | Behrens | 64/15 B |
| 2,363,257 | 11/1944 | Matteucci | 64/27 R |
| 2,379,175 | 6/1945 | Mulheim | 64/27 L |
| 2,858,682 | 11/1958 | Fawick | 64/27 R |
| 3,296,832 | 1/1967 | Fawick | 64/15 B |
| 3,336,765 | 8/1967 | Fawick | 64/27 F |
| 3,996,767 | 12/1976 | Geislinger | 64/27 L |

Primary Examiner—Ira S. Lazarus
Assistant Examiner—R. C. Turner
Attorney, Agent, or Firm—James L. Jackson

[57] ABSTRACT

A rotary energy-transmitting mechanism, according to the present invention, concerns a mechanical structure having inner and outer relatively movable elements that are combined in a mechanism of rotary nature. The inner and outer elements may be combined with other mechanical structure to facilitate utilization of the general mechanical form of the invention for a number of mechanical purposes, all involving transmission of energy which may be between the relatively movable inner and outer elements and/or between the elements and a fluid. The mechanical structure, depending on the arrangement of the relatively movable parts and depending on the inclusion of other specific parts, may take the form of various energy-transmitting mechanisms, such as a mechanical coupling, a universal joint, a rotary shock absorber, a rotary pump, a rotary compressor and a rotary engine. In each case, mechanical interconnection is established between the relatively movable rotary elements by a plurality of vanes and bearing pads that are cooperatively arranged so as to allow the relative movement to occur between the basic parts and from one to the other of the basic elements or to fluids entrapped therein.

2 Claims, 19 Drawing Figures

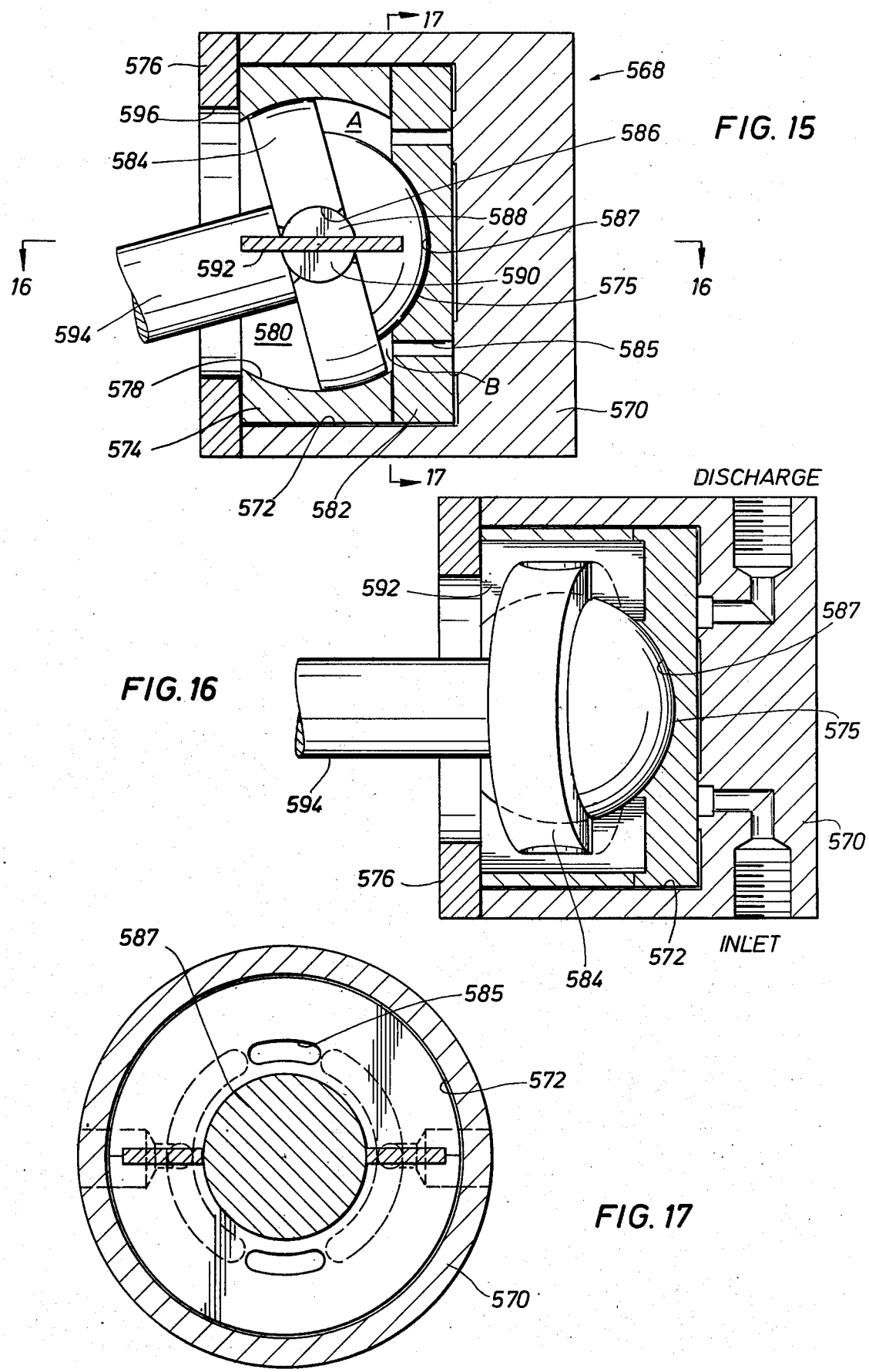

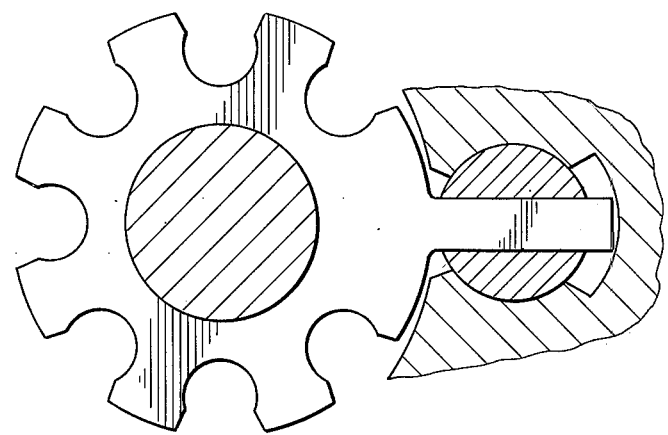
FIG. 18
FIG. 19
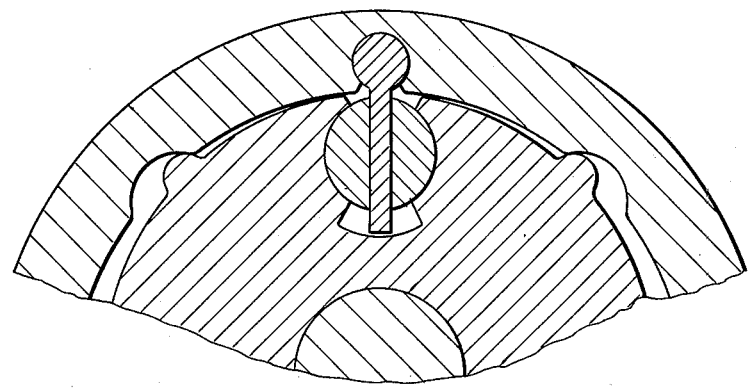

ROTARY ENERGY-TRANSMITTING MECHANISM

This is a continuation of application Ser. No. 872,964, filed Jan. 27, 1978 now abandoned.

FIELD OF THE INVENTION

This invention is related generally to rotary-type mechanical structure having two basic relatively movable inner and outer elements that are coupled by other mechanical structure in such manner as to allow transmission of energy between the basic elements. More specifically, one form of the present invention is directed to inner and outer relatively movable elements, wherein an inner element has systematic rotary oscillation relative to the outer element during energy transmission therebetwen. The relatively movable parts may be so related as to allow misalignment to exist between the axes of the inner and outer structural elements, and yet there is provided a mechanical physical interconnection between the inner and outer parts by means of vane elements emanating from one of the relatively movable elements and supported between bearing pads in the other of the elements on which the vane elements slide. Such axial misalignment may be parallel and/or angular, depending upon the particular mechanical device that is constructed in accordance with the present invention. Energy transmission between the inner and outer structural elements may also take the form of a fluid pressure interchange for energy output or energy absorption.

BACKGROUND OF THE INVENTION

Mechanical devices for transmitting energy in rotary form may take any one of a large number of commercially available mechanical forms. Basically, however, virtually all rotary mechanical devices for transmission of energy take very specific forms and are not readily adaptable to energy transmission mechanisms of other forms. It is a principal feature of the present invention to provide a novel mechanical energy transmission structure that is readily adaptable to any number of various energy-transmitting forms within the spirit and scope of the present invention. The basic force-transmitting principle of the present invention may be readily incorporated into a number of different mechanical devices such as torque-transmitting devices taking the form of universal joints and couplings, fluid compression devices such as pumps and rotary shock absorbers, and energy-generating mechanisms such as rotary engines.

It is also an important feature of the present invention to provide a novel rotary energy-transmitting structure that is of extremely simple nature, being closed of a limited number of parts that may be interrelated to define one of the number of available forms of the present invention.

It is also an important feature of the present invention to provide a novel energy-transmitting mechanism that is of simple nature, is reliable in use, and is low in cost.

Other and further objects, advantages and features of the present invention will become apparent to one skilled in the art upon consideration of this entire disclosure, including this specification and the annexed drawings. The form of the invention, which will now be described in detail, illustrates the general principles of the invention, but it is to be understood that this detailed description is not to be taken as limiting the scope of the present invention.

SUMMARY OF THE INVENTION

In accordance with the present invention, a novel energy-transmitting mechanism may be provided that incorporates four basic structural elements, i.e., an outer element or housing within which is disposed an inner element that is in movable relation with the outer element or housing. The inner element may have a rotary oscillating relationship with the outer element. For the purpose of transmitting energy, a shaft may be coupled to the outer element or housing, while a separate shaft may be coupled to the inner element. To establish an energy-transmitting relationship between the inner and outer elements of the basic energy-transmitting structure, a plurality of vanes may be secured in movable relationship to either of the inner or outer elements and may extend toward the opposite one of the inner and outer elements. The vanes are provided with a rounded base portion that is received within a corresponding mating receptacle in eithr of the inner or outer elements to establish a retained but movable relationship therewith. The vanes also include a flattened portion that extends between a pair of bearing pads that are in turn retained within appropriate receptacles defined in the opposite one of the inner and outer relatively movable elements. The four basic elements of the energy-transmitting structure include the inner and outer elements that have a relatively movable rotary oscillating relationship with interconnection between the inner and outer elements established by a movable mechanical relationship between the vanes and bearing pads.

The bearing pads may have spherical or cylindrical shaped outer bearing surfaces having a bearing relationship with corrspondingly shaped surfaces defined by the walls of the bearing pad receptacle. The inner surface of each of the bearing pads is defined in such manner as to establish a cooperative mating bearing relationship with the substantially flat portions of the vanes. In other words, if the vanes have flat bearing surfaces, the inner surfaces of the bearing pads will also be of flat configuration for the establishment of a mating bearing relationship with the vanes. If the vanes have a bearing surface configuration other than flat, the inner surfaces of the bearing pads will be of a mirror image configuration for the establishment of sufficient surface area contact to promote efficient bearing between the vanes and pads for the purpose of energy transmission.

The bearing pads may define pockets or receptacles at the points of connection thereof to the inner or outer elements and have the general purpose of transmitting force between the inner and outer elements with the force between the bearing pads being transmitted to or received from the vanes, depending upon the particular relationship established between the inner and outer elements, the vanes and bearing pads. The vanes and bearing pads, together with the structural relationship between the vanes and the inner and outer elements of the energy-transmitting structure, are so related as to permit both angular and/or parallel misalignment between the axes of the inner and outer elements. The shafts connected to the inner and outer elements may therefore be placed in misaligned relationship, which misalignment may be of angular or parallel offset relationship. This facility for accommodating misalignment of the axes of the inner and outer structural elements of the energy-transmitting mechanism effectively facilitates utilization of such mechanism as a mechanical coupling and as a universal joint.

The cooperative relationship of the vanes, bearing pads and the respective connection thereof to the inner or outer structural elements may take many different forms within the spirit and scope of the invention, depending upon the operative characteristics that are desired. When the energy-transmitting structure is utilized to define a fluid energy-transmitting system such as an internal combustion engine or a compressor, for example, the relationship of the vanes to the bearing pads may take the form of a piston for the purpose of moving in response to the pressure of gases such as in an internal combustion engine or compression of gases such as in a compressor structure. Basically pumps and engines constructed in accordance with the present invention utilize the four basic features described above and, in addition, include intake and exhaust valves that allow controlled fluid transfer during operation of the mechanism. For example, the bearing pads may be retained by the outer housing structure which is a stationary housing, and the inner movable structural element may have a rotary oscillating relationship with the outer housing structure. An eccentric shaft may be utilized in a rotatable relation to the inner movable structural element. The vane elements may be connected to the inner structural element and, as the inner element oscillates, the vanes will be reciprocated with respect to the bearing pads, causing intake and compression of any compressible medium, depending on the direction of relative movement between the vanes and the bearing pads.

A rotary pump mechanism may also be defined by incorporation of the basic elements of the energy-transmitting mechanism into an eccentric type oscillating pump with swinging vanes that divide the space between the inner and outer structural elements into a plurality of pumping chambers. The volumes of the pumping chambers decrease and increase during relative movement between the inner and outer structural elements, causing intake of fluid during increasing volumetric changes and causing compression and exhaust of the compressible fluid medium during decreasing volumetric changes.

The basic components may also be structurally related so as to define a rotary shock-absorbing device having the purpose of absorbing the shock of a rotary motion by limiting the rate of the motion and controlling the rate of flow of a fluid such as liquid or gas from one chamber to another. In this case, the shock-absorbing chambers also have a volumetric changing capability with fluid transfer between the chambers during decrease in volume being accomplished by passing the fluid through a restricted orifice from one chamber to another.

BRIEF DESCRIPTION OF THE DRAWINGS

So that the manner in which the above recited features, advantages and objects of the present invention, as well as others, which will become apparent, are attained and can be understood in detail, more particular description of the invention briefly summarized above may be had by reference to the embodiments thereof which are illustrated in the appended drawings, which drawings form a part of this specification.

It is to be noted, however, that the appended drawings illustrate only typical embodiments of the invention and are therefore not to be considered limiting of its scope, for the invention may admit to other equally effective embodiments.

In the drawings:

FIG. 1 is a sectional view taken along line 1—1 in FIG. 2, illustrating an energy-transmitting mechanism constructed in accordance with the present invention and showing the invention as taking the form of a flexible coupling device having the purpose of transmitting a rotational force from one shaft to another with severe angular and parallel misalignment.

FIG. 2 is a sectional view taken along line 2—2 in FIG. 1 and illustrating further structural details of the energy-transmitting mechanism of FIG. 1.

Figure 3:
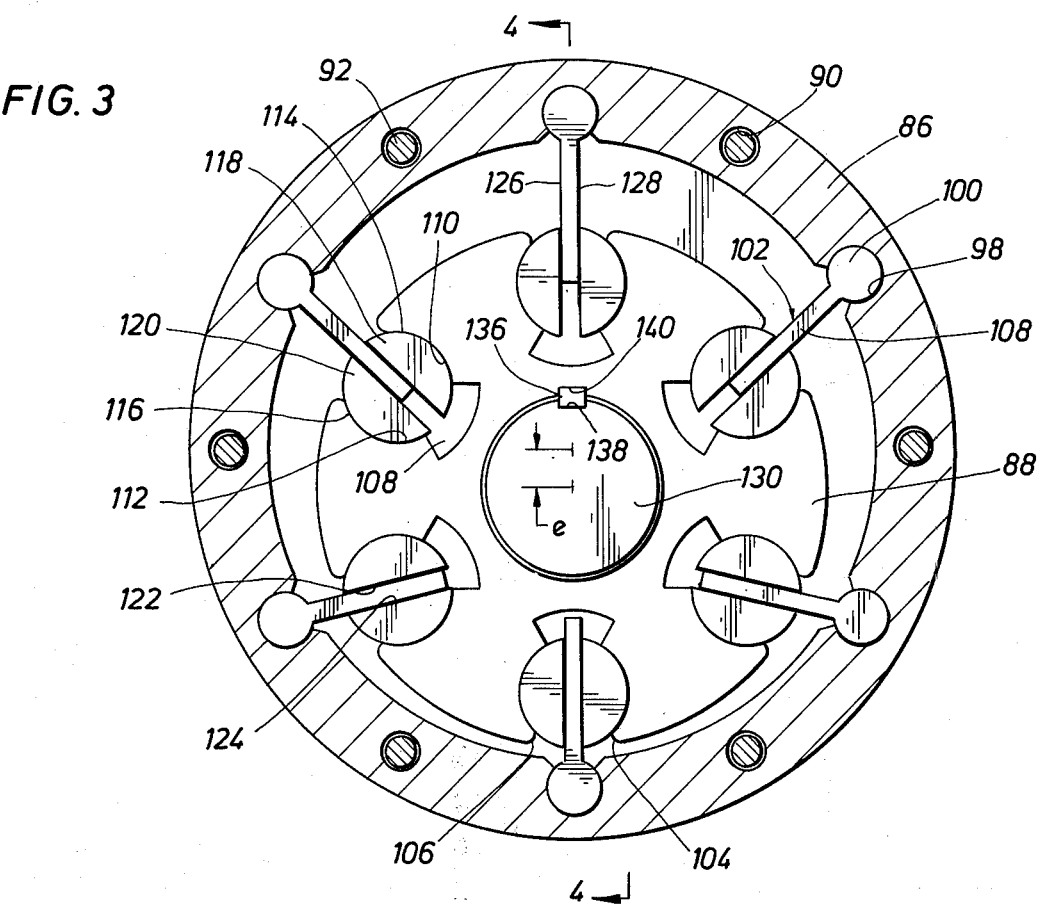
Figure 4:
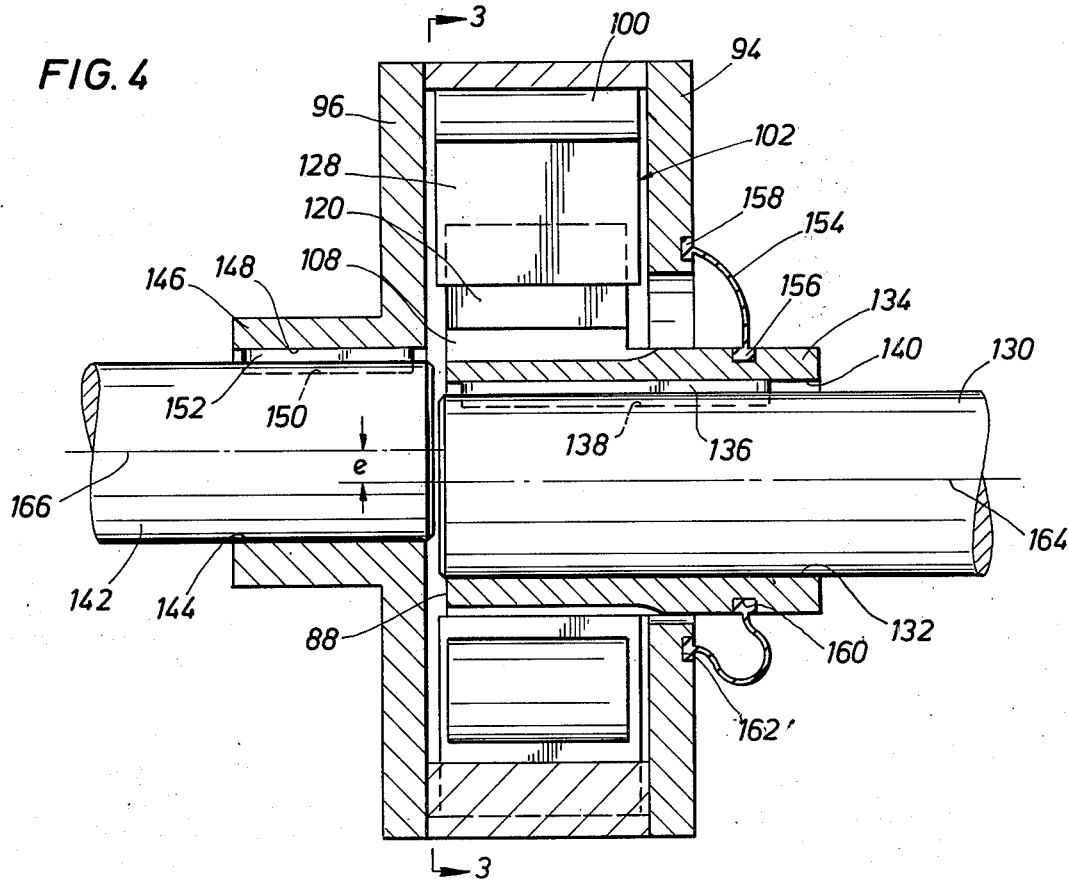

FIG. 3 is a sectional view of an energy-transmitting mechanism representing a modified embodiment of the present invention, which sectional view is taken along line 3—3 of FIG. 4 and represents the invention as taking the form of a flexible coupling device having the purpose of transmitting a rotational force from one shaft to another with the axes of the shafts being disposed in offset parallel relationship.

FIG. 4 is a sectional view taken along line 4—4 of FIG. 3 and illustrating further details of the flexible coupling structure.

Figure 5:
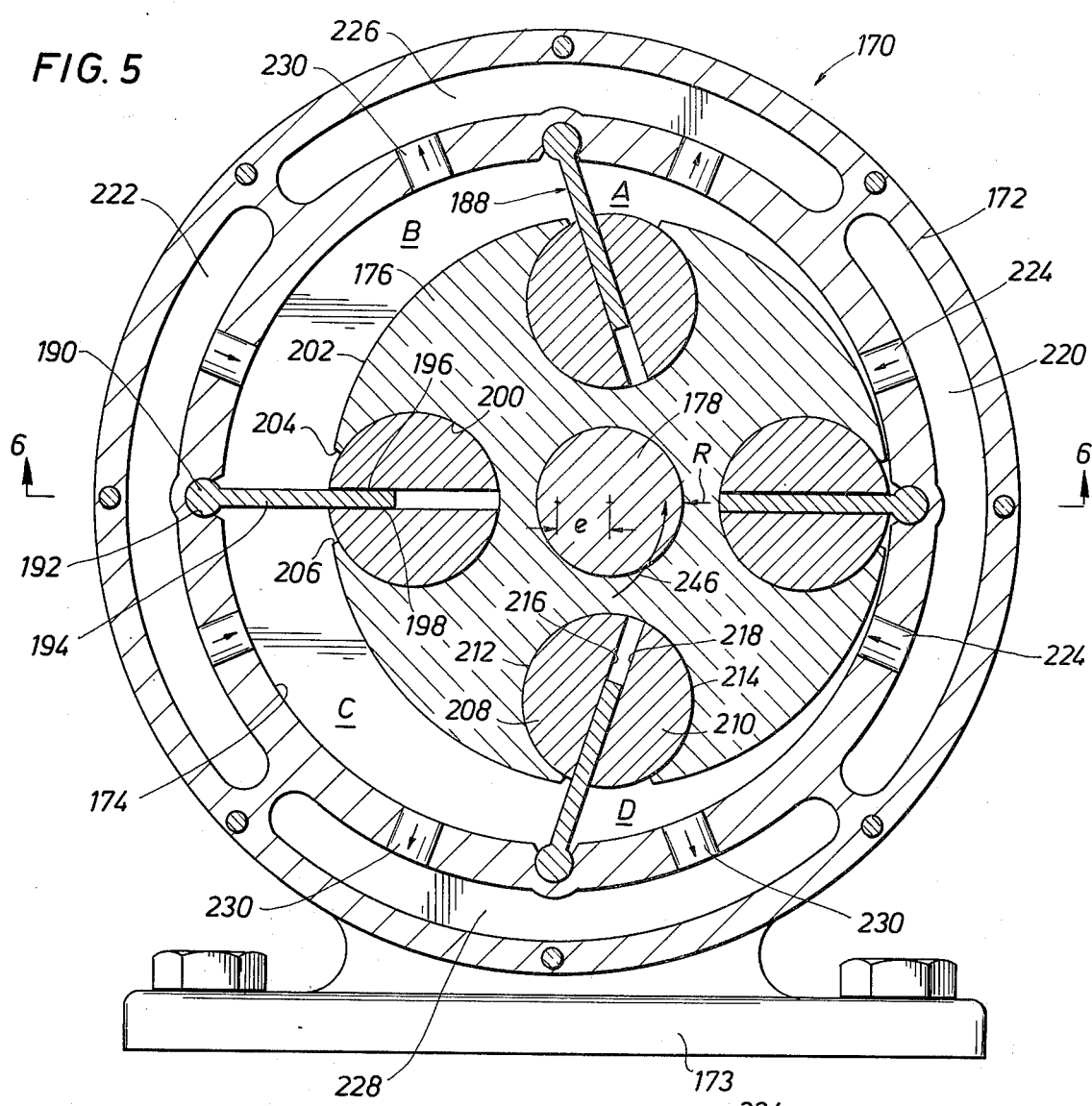

FIG. 5 is a sectional view of an energy transmission mechanism constructed in accordance with the present invention and illustrating utilization of the basic concept of the present invention in the formation of a pumping device that also accomplishes pumping of a fluid medium by volumetric changes in pumping chambers that are defined between the inner and outer structural elements and separated by the vanes.

Figure 6:
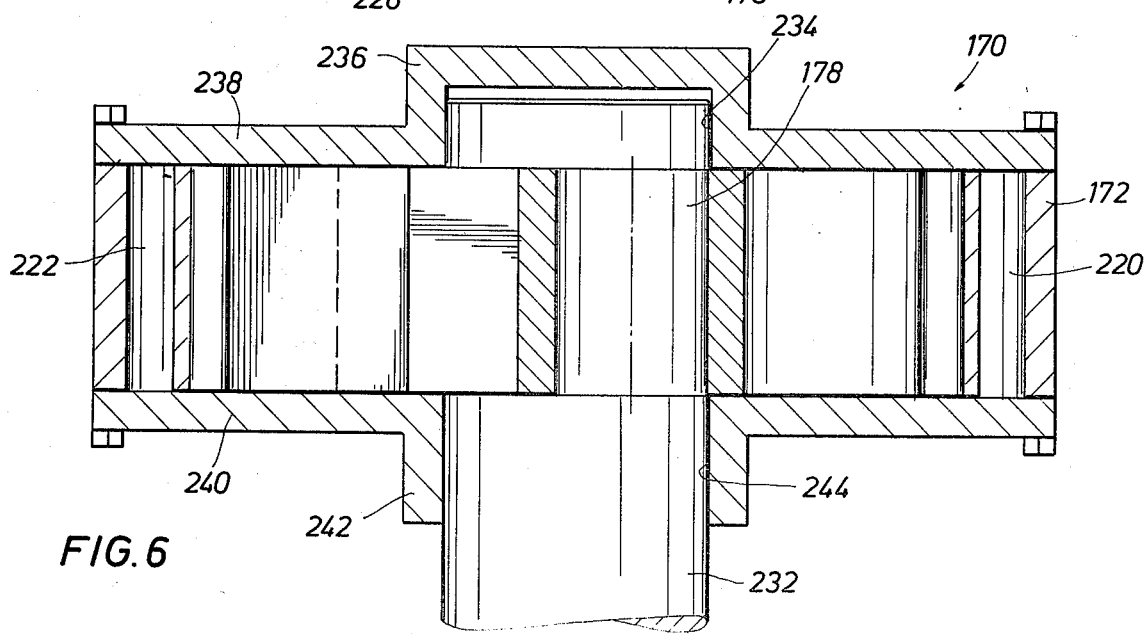

FIG. 6 is a sectional view of the pump structure of FIG. 5 taken along line 6—6 in FIG. 5.

Figure 7:
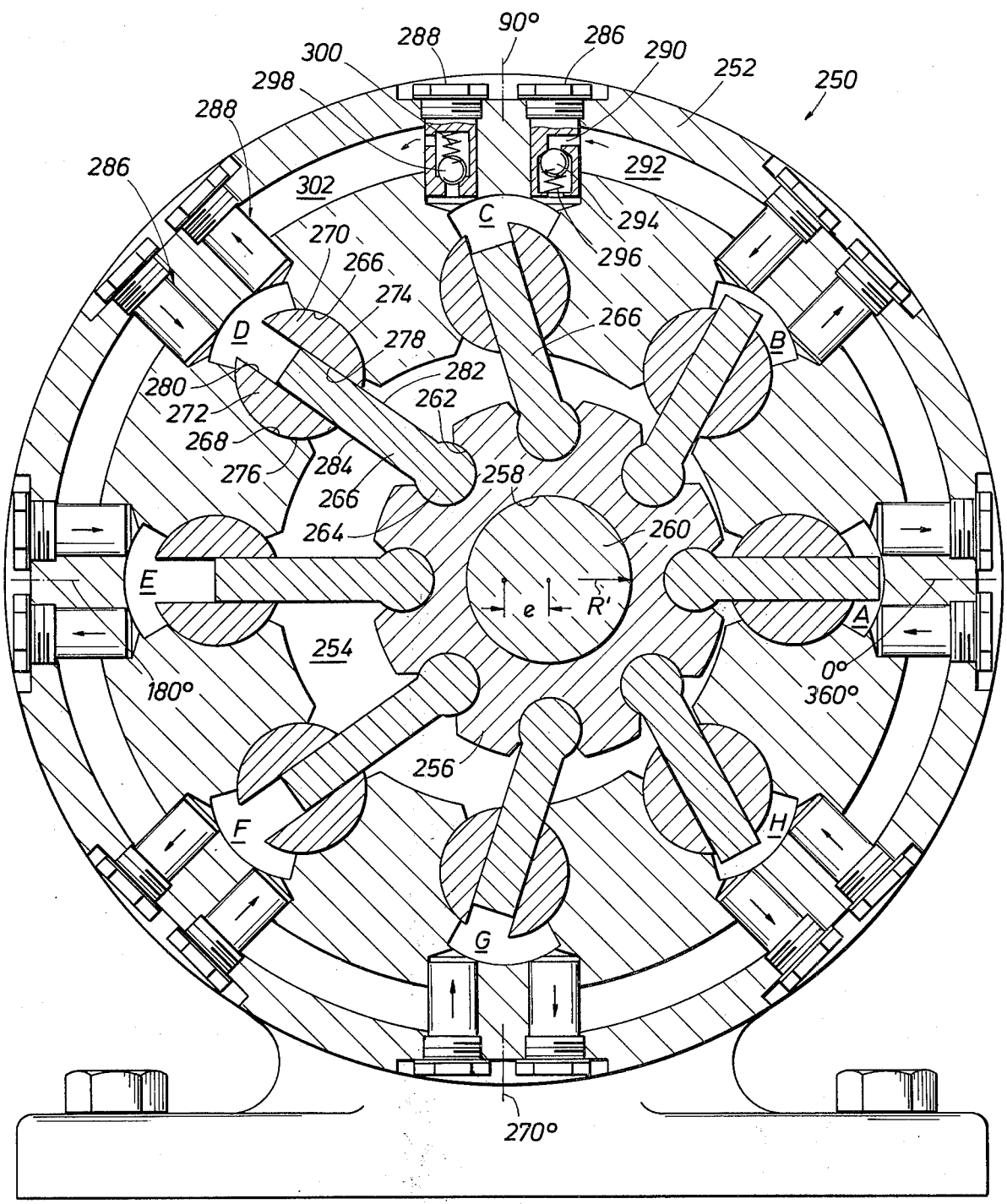

FIG. 7 is a sectional view illustrating application of the basic concept of the present invention to a radial piston vane-type pump having the purpose of accomplishing pressurized fluid transfer, with such fluid transfer being accomplished by increasing and decreasing volumes within pockets formed by the basic elements.

Figure 8:
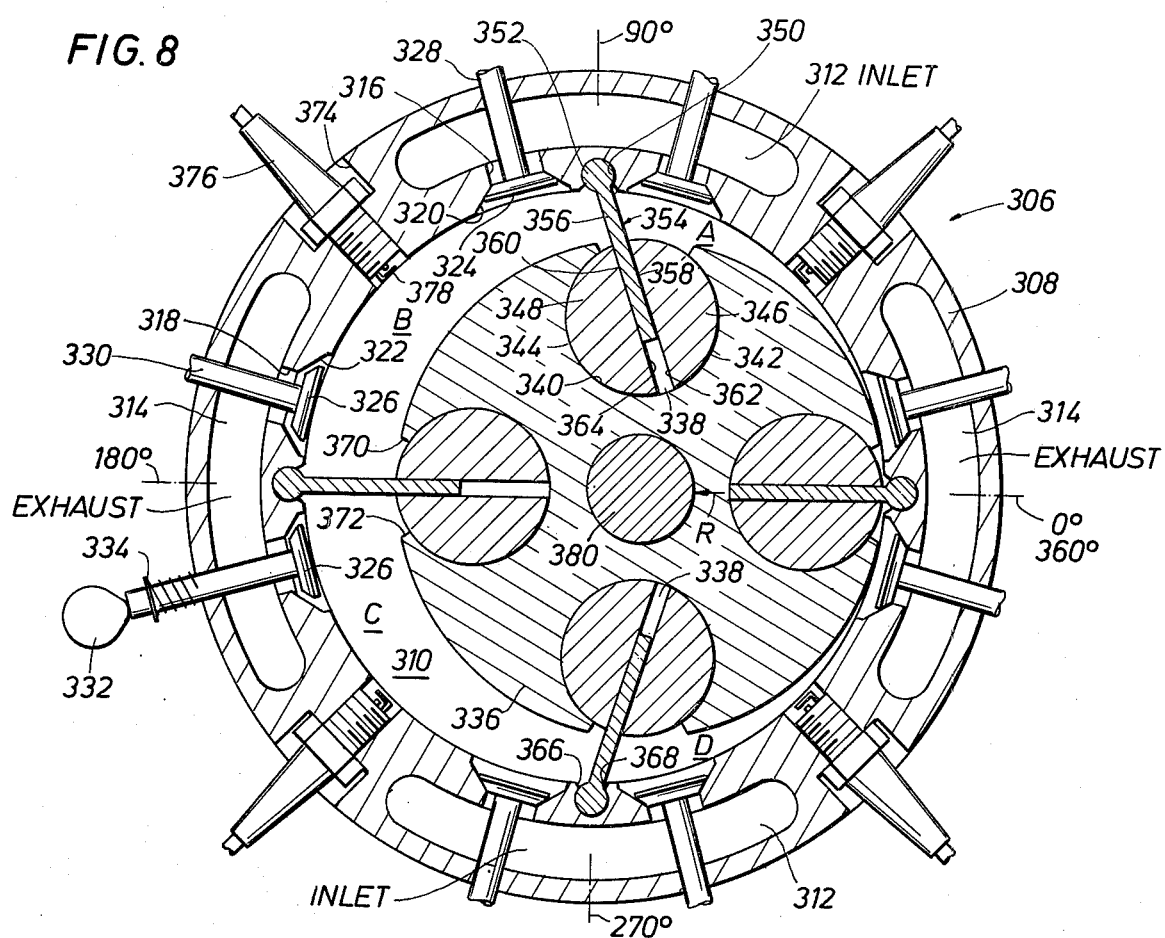

FIG. 8 is a sectional view illustrating application of the basic concept of the present invention to an internal combustion engine of rotary nature.

Figure 9:
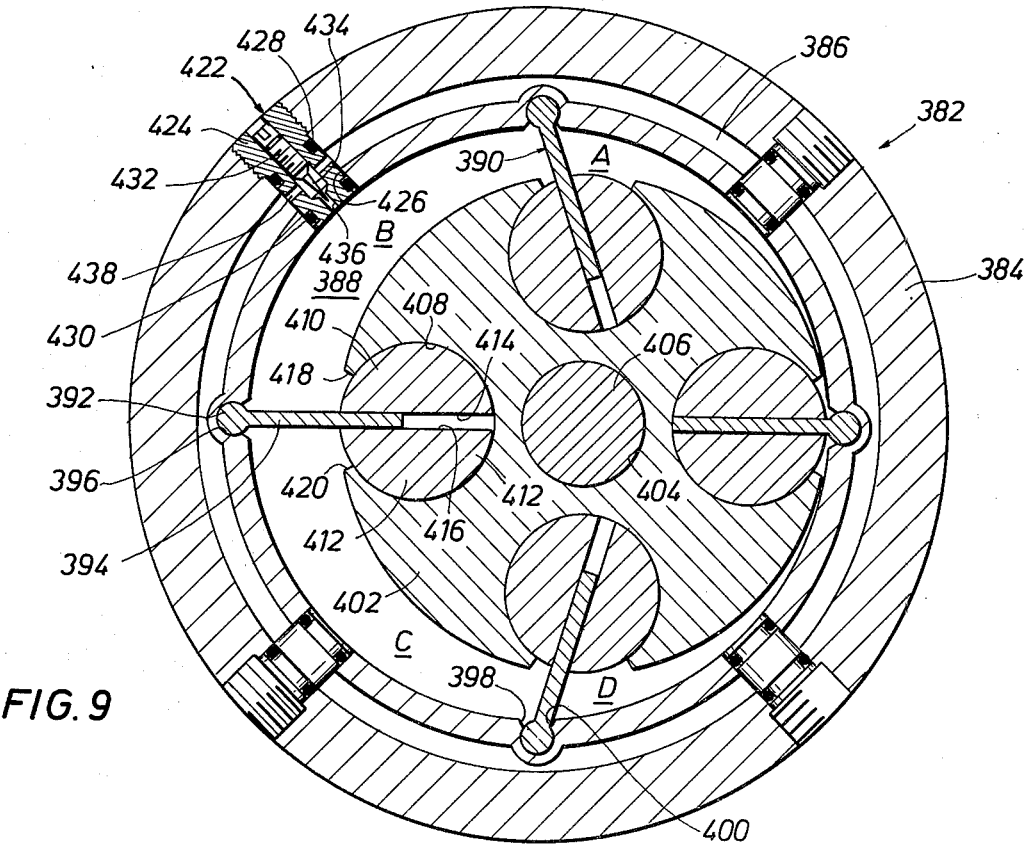

FIG. 9 is a sectional view illustrating a rotary shock-absorbing device incorporating the basic concept of the present invention and which absorbs the shock of a rotary motion by limiting the rate of the motion with such rate limitation being accomplished by controlling the transfer of fluid between chambers that change in volume during operation.

Figure 10:
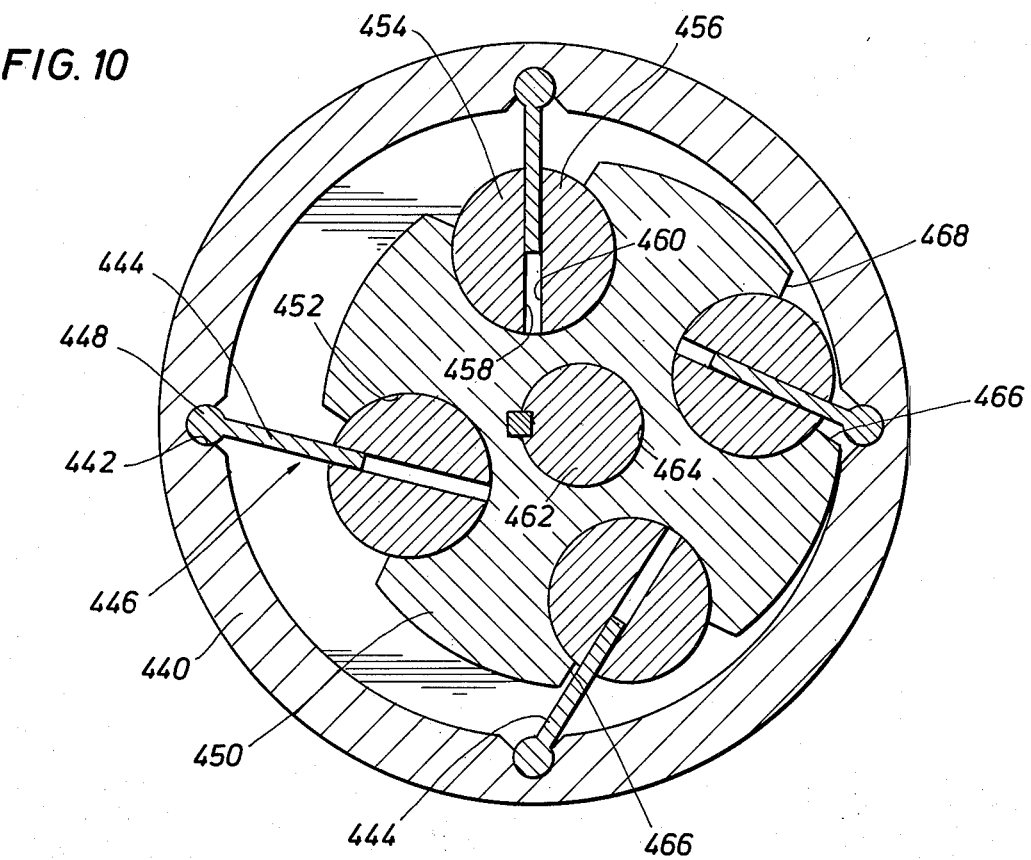

FIG. 10 is a sectional view of a coupling structure incorporating the basic principles of the present invention.

Figure 11:
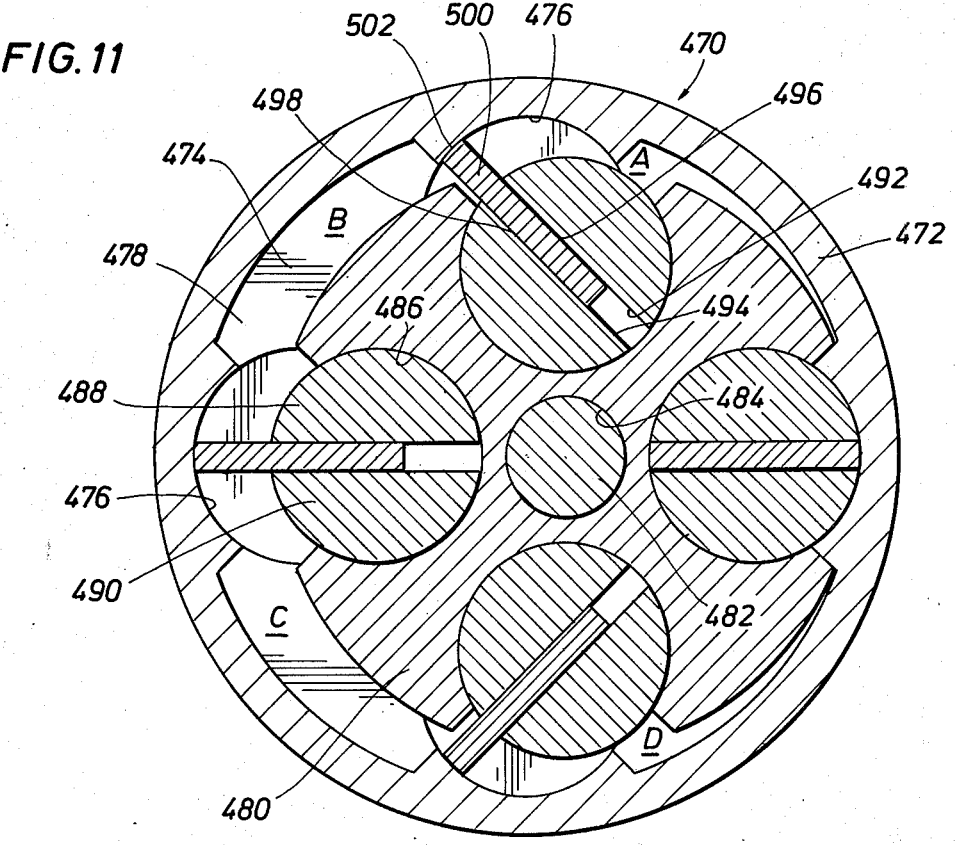

FIG. 11 is also a sectional view of an energy-transmitting mechanism taking the form of a coupling structure that may be effectively employed as a torque-transmitting device and which incorporates vanes and bearing pads having a modified form.

Figure 12:
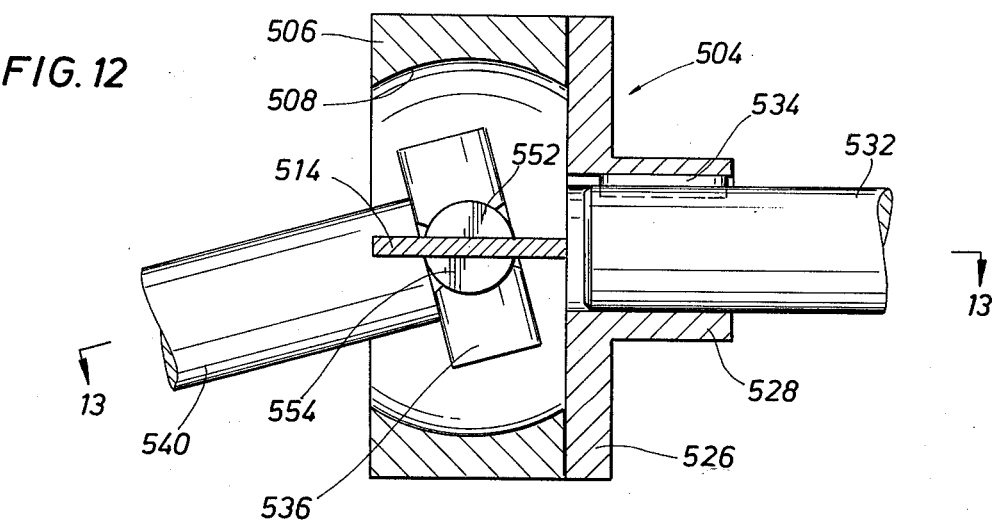

FIG. 12 is a sectional view of a mechanical coupling device such as a universal joint being constructed in accordance with the basic principles of the present invention.

Figure 13:
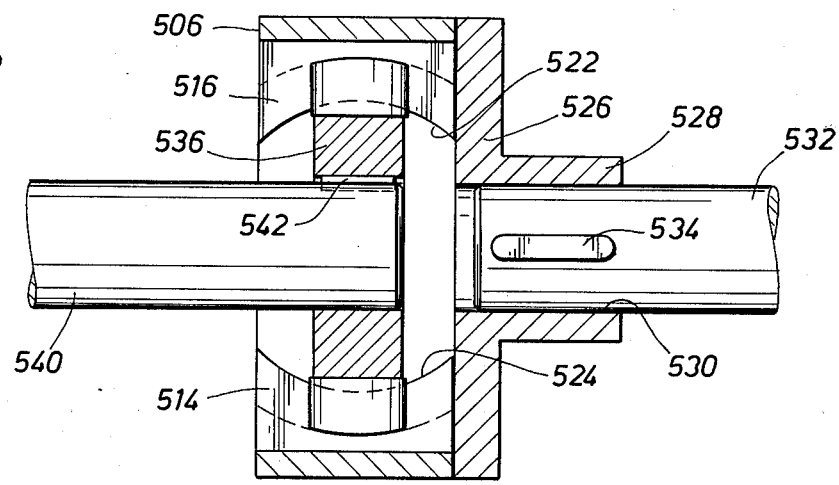

FIG. 13 is a sectional view taken along line 13—13 of FIG. 12 and showing further structural details of the coupling device.

Figure 14:
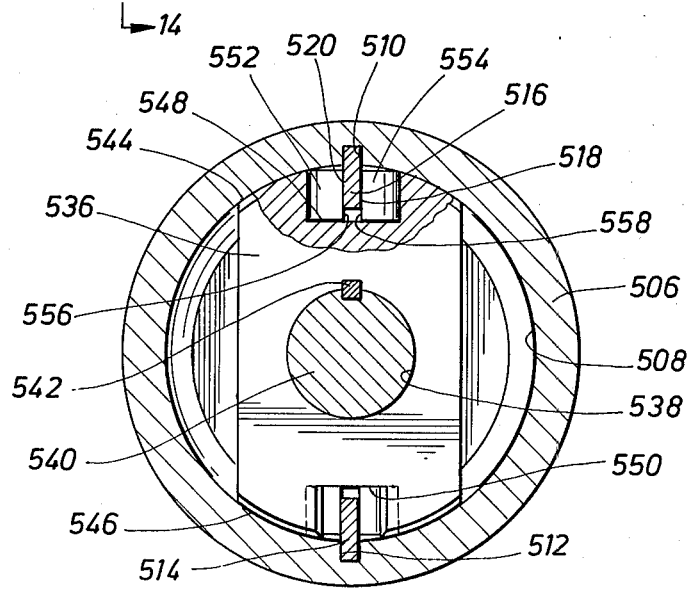

FIG. 14 is a sectional view taken along line 14—14 of FIG. 13 for further explanation of the structural details of the coupling structure shown in FIGS. 12 and 13.

FIG. 15 is a sectional view of a pump mechanism constructed in accordance with the basic principles of the present invention and accomplishing pumping of a fluid medium by pumping chambers that vary in dimension as inner rotary elements rotate relative to a stationary housing.

FIG. 16 is a sectional view taken along line 16—16 of FIG. 15 and showing further structural details of the pump mechanism.

FIG. 17 is a sectional view taken along line 17—17 of FIG. 15.

FIG. 18 is a view illustrating an inner structural element having an integral vane formed thereon for the purpose of eliminating or counteracting any reverse torque effect that might develop.

FIG. 19 is a fragmentary sectional view illustrating a particular mechanical interrelation that might be utilized in energy-transmitting mechanisms constructed in accordance with the principles of the present invention.

DETAILED DESCRIPTION OF PREFERRED EMBODIMENTS

The present invention relates to a mechanism for transmission of energy which, throughout this specification, will be described in detail as it relates to various forms that are possible within the spirit and scope of the present invention. It is to be understood that forms of the invention not disclosed herein are possible within the spirit and scope of the invention.

Figure 1:
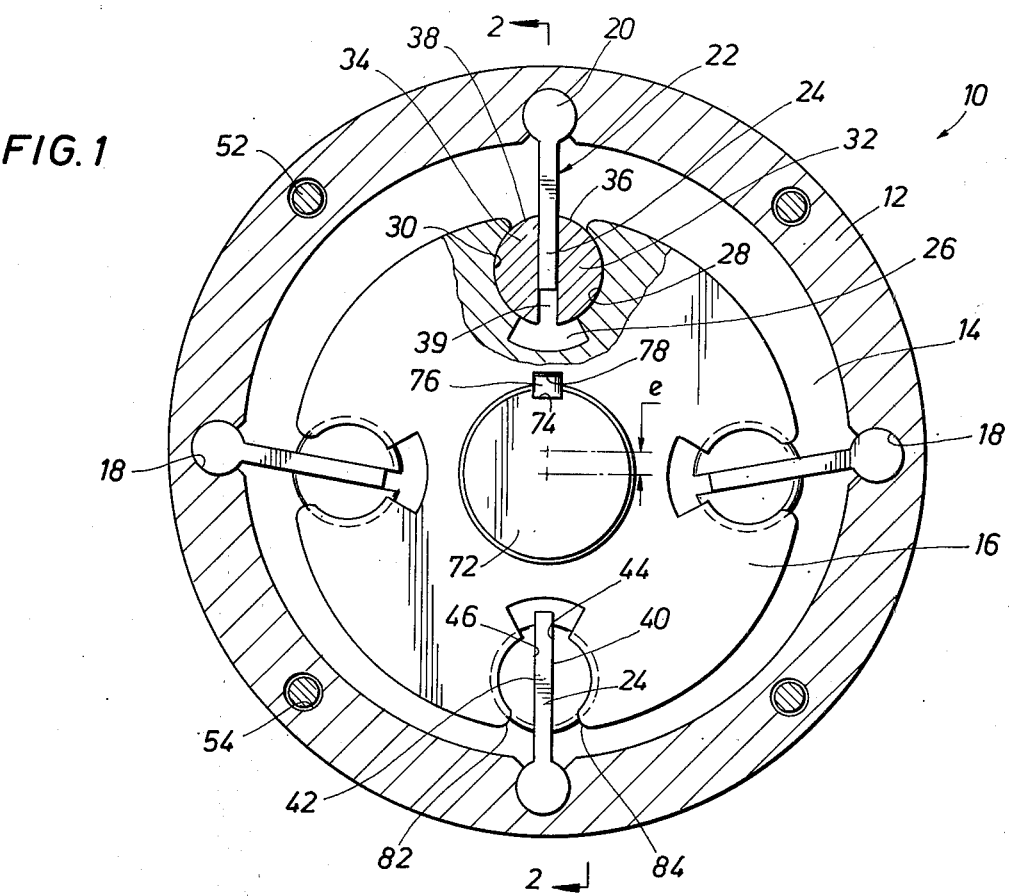

With reference now to FIG. 1, the energy-transmitting mechanism of the present invention generally consists of a structure that permits misalignment to exist between the axes of inner and outer structural elements and yet provides physical interconnection between these structural elements by means of vaned surfaces emanating from one of the elements and supported between bearing pads in the opposite one of the elements on which the vane surfaces slide. Depending upon the particular arrangement involved, the misalignment may be parallel or angular, as desired, or the axes may be perfectly aligned if desired.

By varying the design incorporating the inner and outer structural elements, the vane elements and the bearing pads, the composite design will be capable of accomplishing one of three basic functions. The structural relationships between the parts may be utilized for the transmission of torque between the inner and outer elements through the vanes. The structure may also be utilized for compression of liquids or gases resulting from compressive transfer of such gases by variable volume chambers that are formed between the basic elements which vary in size as rotation occurs. The invention may also take the form of an operative structure that incorporates both the transmission of torque and compression of liquids or gases, depending on the functional nature of the structure involved. Various design variations incorporating the basic concept of the present invention may be grouped into structural categories incorporating straight shafts and eccentric shafts. Those having straight shafts may incorporate either a swinging vane, a rotary vane or a fixed vane, depending on the particular features that are desired. Where an eccentric shaft is employed, the vane structure may be either swinging or rotary, again depending on the particular application involved. Further, through combinations of functional and structural variations, the present invention may conveniently take the form of a number of basic application groups, including power transmission, pumps, internal combustion engines and rotary shock absorbers. Grouping of the various forms of the invention in accordance with function, structure and application may be ascertained readily by the following chart:

| Function | GROUP Structure | Application |
|---|---|---|
| (1) Transmit Torque | (1) Straight Shaft<br>a. Swinging vane<br>b. Rotary vane<br>c. Fixed vane | (1) Power Trans. |
| (2) Compression | (2) Eccentric Shaft<br>a. Swinging vane<br>b. Rotary vane | (2) Pump |
| (3) Combined | | (3) Internal Combustion Engine |
| | | (4) Rotary Shock Absorber |

Figure 2:
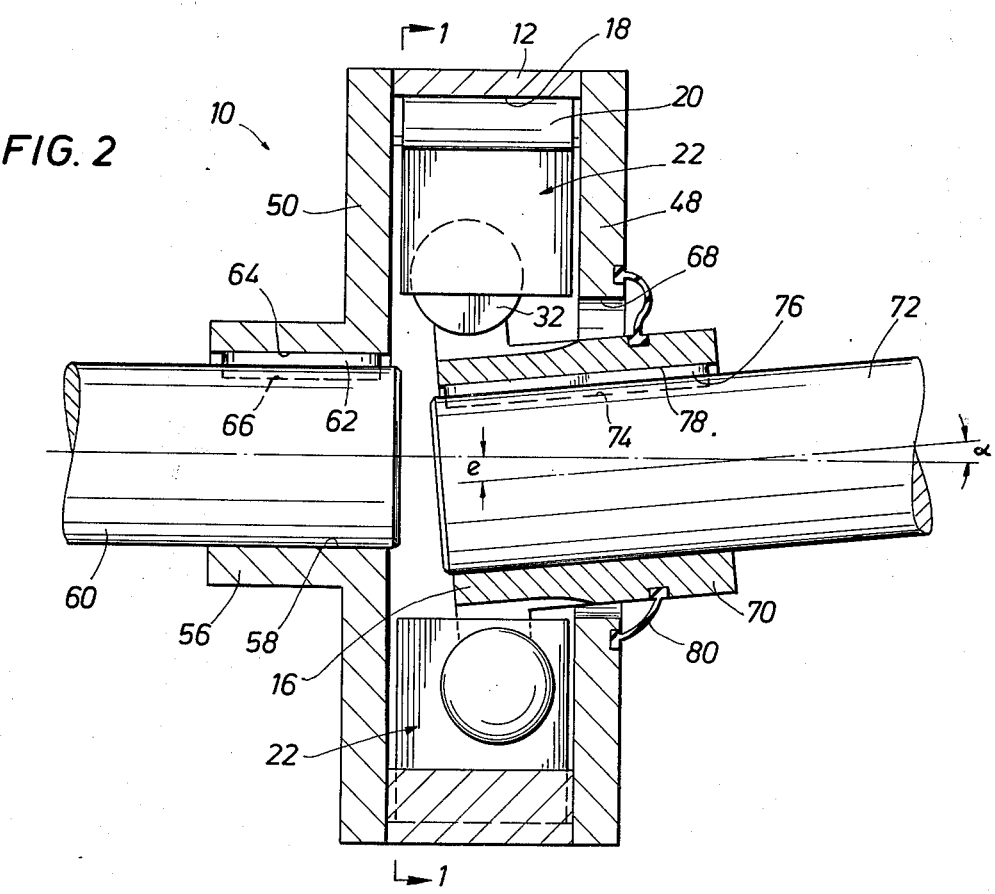

As shown in FIGS. 1 and 2, the present invention may conveniently take the form of a flexible coupling device having the purpose of transmitting a rotational force from one shaft to another with severe angular and parallel misalignment. The coupling structure may incorporate a straight shaft with a swinging vane and may transmit torque for the purpose of power transmission. The coupling structure illustrated generally at 10 may incorporate an outer structural element 12 in the form of a housing that is of generally cylindrical configuration defining an inner receptacle 14 within which may be disposed an inner structural element 16 having a movable relationship with the outer housing structure. The outer housing may also be formed to define a plurality of bores 18 that are disposed in generally parallel relationship with the axis of the outer housing structure. Within the receptacles defined by the plurality of bores may be received the base portions 20 of vane elements 22 that have substantially flat force-transmitting portions 24. The base portions of the vane elements 22 may be of generally cylindrical configuration and may have a swinging movable relationship with the outer housing structure, as is evident from the various positions of the vanes in FIG. 1.

The inner structural element 16 of the coupling structure may be formed to define a plurality of bearing pad receptacles 26, each defining partially spherical bearing surfaces 28 and 30. Pairs of bearing pads 32 and 34 may be located within respective ones of the receptacles 26 and may define at least partially spherical outer surfaces 36 and 38 having mating relationship with the respective partially spherical bearing surfaces 28 and 30. The dimension of the bearing pads may be such that location thereof within the receptacle in abutment with respective ones of the bearing surfaces causes a space 39 to be developed between the bearing pads. The substantially flat portion of the vanes 22 may be received within the space 39, and bearing surfaces 40 and 42 defined on the flat portion 24 of the vanes may be disposed in bearing engagement with bearing surfaces 44 and 46 defined at respective inner portions of each of the bearing pads. The spaced bearing pads with the flat portion of a vane positioned therebetween substantially fills the bearing pad receptacle and causes the bearing pad and vane assembly to have a close fitting but freely movable bearing relationship with the bearing surfaces 28 and 30 of the inner structural element 16. The structurally interfitting relationship between the vanes and bearing pads, the outer housing or element 12 and the inner structural element 16 effectively allows the vane elements 22 to be capable of pivoting or swinging relative to the outer housing 12 and also pivoting or swinging relative to the inner structural element 16. Additionally, the vane elements 22 are capable of reciprocating within the space 39 between the bearing pads. Such reciprocation is evident from the various positions illustrated in FIG. 1 of the drawings.

As indicated above, the vane elements 22 may be provided with a substantially flat portion 24 having surfaces 40 and 42 formed thereon that have a mating bearing relationship with surfaces 44 and 46 defined at the inner portions of the bearing pads. The surfaces 40 and 42 may be of planar configuration if desired.

As is evident from FIG. 2, the coupling structure may be provided with a cover plate 48 and a drive plate 50 that may be held in assembly with the body section 12 by means of bolts 52 or other connection devices that extend through a plurality of apertures 54 that are bored within the housing element 12. A hub portion 56 of the drive plate 50 may be bored such as shown at 58 to receive a driven shaft 60, with the driven shaft being retained in assembly with the drive plate 50 by means of a driven shaft key 62 that is retained within a keyway 64 in the hub and is also received within the keyway 66 defined in the shaft. The driven shaft 60 therefore has a non-rotatable relationship with respect to the drive plate 50.

The cover plate 48 may be formed to define a central aperture 68 through which the hub portion 70 of the inner structural element 16 extends. A drive shaft 72 having a keyway 74 formed in the extremity thereof may receive a drive shaft key 76 that is also retained within a keyway 78 formed in the hub portion of the inner structural element for the purpose of establishing a non-rotatable relationship between the inner structural element and the drive shaft 72. A dust cover 80 may be provided, having portions thereof received within respective dust cover grooves formed in the cover plate 48 and the hub portion of the inner structural element. The dust cover may be flexible so as to compensate for angular misalignment of the shafts, such as shown in FIG. 2.

Basically the purpose of the generally cylindrical shaped outer element or housing is to receive the torque that is transmitted through the vanes 22 to drive plate 50. The cylindrical body portion as shown in FIGS. 1 and 2 may be bored through at four 90° offset locations parallel to the axis thereof to accept the generally cylindrical base portions of the four vanes. The housing structure may also be bored and tapped or through-drilled to receive bolts that support the drive plate 50 and the cover plate 48. The inner structural element is freely movable within the outer structural element within limits defined by the relationship thereof with the vanes and bearing pads. The inner element is a generally circular component having as its purpose the transmission of torque through the spherical bearing pads to the vanes. The inner structural element supports the drive shaft 72 that is received within a bore formed in the hub thereof and also provides support for the bearing pads by means of the bearing pad receptacles or sockets that are defined therein at 90° offset relationship about the peripheral portion of the inner structural element.

The purpose of the vanes is to transmit torque from the inner structural element 16 to the outer structural element 12, and this is accomplished by the relationship of the vanes to the bearing pads. The bearing pads, in turn, transmit forces from the inner structural element to the vanes and permit both angular and parallel misalignment between the axes of the inner and outer structural elements of the coupling. The bearing pads also provide bearing surfaces for the purpose of establishing efficient force transmission between the vanes and the bearing pads.

The coupling structure shown in FIGS. 1 and 2 is in the relaxed or unloaded condition. As torque is applied to the drive shaft 72, the vanes will pivot with respect to the housing element 12 and the inner structural element or rotor 16 so as to establish an inclined relationship between the vanes and the respective inner and outer structural elements of the coupling. The loaded relationship of the vanes may be visualized by reference to FIG. 10 of the drawings. The angular misalignment, depicted by angle $\alpha$, is compensated for by a rolling motion of the pads 32 and 34 in their respective sockets. Because of the position of the inner and outer portions of the coupling structure, the pad assemblies in the horizontal plane will roll or swing with respect to both the inner and outer structural elements, but the pad assemblies in the vertical plane will not be subjected to such rolling or swinging movement. The pad assemblies in the vertical plane, however, will compensate for the angular misalignment $\alpha$ by sliding down the flat bearing surfaces of the vanes. The parallel misalignment is compensated for by pivoting of the vanes about the base portion thereof.

When torque is applied to the drive shaft 72, respective ones of the rounded surfaces 82 or 84, defining an entrance opening through which the vanes extend into the respective sockets, will come into contact with one of the bearing surfaces of the respective vanes. Only one vane will be transmitting the entire torque unless the axes of the drive and driven shafts are positioned in coaxial relationship. The force is transmitted in this manner through a 90° rotation of the inner structural element, at which point the lagging or following vane of the rotational sequence will establish contact with the respective surface 82 or 84 of the inner structural element. This process continually repeats itself as rotation continues and thereby establishes an efficient mechanical coupling structure that also facilitates universal movement and prevents any detrimental force buildup on components of the coupling structure in the event the drive and driven shafts may be misaligned.

While the coupling structure illustrated in FIGS. 1 and 2 has been described with transmission of rotational forces from the drive shaft 72 to the driven shaft 60, such description is not intended to place any limitations whatever on operation of the coupling. Conversely, the shaft 60 may be a drive shaft while shaft 72 may serve efficiently as the driven shaft. The coupling structure also functions efficiently regardless of the particular direction of shaft rotation. The coupling structure may also incorporate any desired number of vanes and corresponding bearing pads, depending upon the force characteristics that are intended to be transmitted through the structure. Also, the bearing pads may be designed with a diameter equal to the extension of the vanes, such as is illustrated in FIG. 8 of the drawings. The freedom of relative movement that is allowed by the coupling structure illustrated in FIGS. 1 and 2 effectively promotes utilization of the coupling under circumstances where angular misalignment of the drive and driven shafts is substantially greater than is possible with conventional coupling devices.

With reference now to FIGS. 3 and 4, the present invention may be effectively utilized under conditions where torque is to be transmitted between drive and driven shafts that have their respective axes positioned in parallel but offset relationship. In this case, the coupling structure is much like the coupling structure illustrated in FIGS. 1 and 2, with the exception that the bearing pads, if desired, may be of generally cylindrical outer configuration because the swinging movement thereof needs to occur only about a single axis. There may be provided an outer structural element or housing 86 within which may be positioned an inner structural element 88. The outer structural element or housing may be drilled and tapped or through-bored, as shown at 90, for the purpose of receiving threaded bolts or studs 92 that secure a cover plate 94 and a drive plate 96 in assembly with the housing structure. The housing may also be formed to define a plurality of at least partially cylindrical bores 98 within which may be received the generally cylindrical portions 100 of a plurality of vane elements illustrated generally at 102. The bores are located with respect to the housing so as to define openings bounded by opposed surfaces 104 and 106. The substantially flat portion 108 of each of the vane elements extends through the opening and may engage one of the surfaces 104 and 106 during operation of the mechanism. The cylindrical portion 100 of the vane elements has a closely interfitting but freely pivotal relationship relative to the cylindrical bores within which the base portions of the vane elements are received. The vane elements, therefore, are allowed to pivot relative to the outer housing structure 86 within limits defined by the inner surfaces 104 and 106.

The inner structural element 88 may also be formed to define a plurality of bearing pad receptacles or sockets 108 having partially cylindrical surfaces 110 and 112 defined thereby that have a mating intimate bearing relationship with generally cylindrical outer surface portions 114 and 116 defined on each of several pairs of bearing pads 118 and 120. Here again, the bearing pads 118 and 120, when received in properly fitting relationship within the respective pockets, define bearing surface 122 and 124 that have intimate bearing engagement with bearing surfaces 126 and 128 defined by the flat portion 108 of each of the vane elements. Here again it should be borne in mind that the bearing surfaces 126 and 128 of each of the vane elements may be of planar configuration, if desired, or in the alternative may take any other suitable form as is convenient. The bearing surfaces 122 and 124 of each of the bearing pads must be complementary to the particular configuration of the respective bearing surfaces 126 and 128 in order to establish efficient bearing contact between the vane elements and the pads.

Since the coupling structure illustrated in FIGS. 3 and 4 does not concern angular misalignment of the drive and driven shafts interconnected by the coupling structure, it is only necessary that the bearing pads have a rotary relationship within the respective bearing pad receptacles. This being the case, the bearing pads may be of generally semi-cylindrical configuration rather than generally spherical, as shown in FIGS. 1 and 2.

The coupling structure illustrated in FIGS. 3 and 4 may include a drive shaft 130 that may have one extremity thereof positioned within a bore 132 formed in a hub portion 134 of the inner structural element 88 of the coupling. A drive shaft key 136 may be received within keyways 138 and 140 formed in the shaft and internal structural element respectively to establish a non-rotatable relationship between the drive shaft and the internal structural element.

A driven shaft 142 may be received within a bore 144 defined within a hub portion 146 of the drive plate 96. Keyways 148 and 150 may be formed in the hub portion 146 and the driven shaft 142 and may receive a driven shaft key 152 that establishes a non-rotatable relationship between the driven shaft and the drive plate.

It will be desirable to lubricate the coupling structure to prevent unnecessary wear during use, and such may be conveniently accomplished by providing a lubricant and dust seal such as shown at 154 having annular connector portions thereof 156 and 158 retained respectively within annular slots 160 and 162 defined in the hub 134 and the cover plate 94. The lubricant and dust seal must of course be of flexible nature in order to maintain a seal and yet allow relative movement to occur between the inner and outer structural elements of the coupling.

The view illustrated in FIGS. 3 and 4 shows the coupling device in the relaxed or unloaded position as in the description of the coupling structure of FIGS. 1 and 2. The view shown in FIG. 10 will approximate the relative positions of the mechanical components of the coupling structure with torque applied to the drive shaft and being transmitted through the coupling structure to the driven shaft. Angular misalignment is not allowed because of the cylindrical shaped bearing pads. The parallel misalignment of the axes of the shafts is compensated for in the same manner as described above in connection with FIGS. 1 and 2. When torque is applied to the drive shaft 130, the inner structural element 88 will rotate with respect to the outer structural element 86 within limits defined by the pivotal relationship of the bearing pads within the respective bearing pad receptacles. The rounded force-transmitting surfaces 104 or 106, depending upon the direction of rotation, will be engaged by one or more of the vanes 102 as the vanes also pivot within their respective bearing aperture pockets 98. After the coupling structure has become loaded in this manner, torque will be transmitted from the inner structural element through the vanes and to the outer structural element. With the vanes offset at 60 angles, as shown in FIGS. 3 and 4, the coupling structure will rotate 60 with one of the vane elements in contact with one of the surfaces 104 or 106. After this has occurred, a succeeding vane will engage its respective rounded surface 104 or 106 and will function to transmit torque while the preceding vane will move slightly away from the respective torque-transmitting surface 104 or 106. Further continued rotation will cause another succeeding vane to take up the force-transmitting capability of the coupling and so on throughout each 60° rotational segment of a single revolution of the coupling structure.

Although six vane and bearing pad assemblies are shown to be provided for the coupling structure illustrated in FIGS. 3 and 4, it is not intended to limit the present invention to this particular coupling structure configuration. It is intended that the coupling may incorporate any suitable number of vane and bearing pad assemblies for the purpose of transmitting torque, depending upon the particular loading, rotational speed or other operative environment, without departing from the spirit or scope of the present invention. The drive and driven shafts may obviously be reversed if desired, and also if desired the bearing pads may be designed with a diameter equal to or exceeding the length of the flat portions of the respective vanes, such as is shown in FIG. 8 of the drawings.

Because the motion between the vanes and bearing pads is radial, except for a thrust that occurs along the axes of the shafts, the vanes can be modified to include radial grooves and/or ridges perpendicular to the axis of the base portion of the vane. The purpose of these ridges or grooves could be to promote retention of lubricant and to provide a stable but movable relationship between the vanes and the bearing pads.

Hereinabove, the present invention has been described as it relates to coupling devices which may compensate for angular or parallel misalignment of drive and driven shafts that are interconnected by means of the coupling structure. As also explained above, it is not intended to limit the present invention solely to coupling structures. The invention therefore, generally concerning a mechanical energy transmission system, may find an effective form in a pumping mechanism utilizing the basic energy-transmitting form of the present invention. With reference now to FIGS. 5 and 6, there is illustrated a pumping device 170 incorporating the basic force transfer system of the present invention and incorporating a plurality of variable volume pumping chambers. The pump mechanism 170 may include an outer housing 172 defining a generally cylindrical internal surface 174. Within a central chamber defined by the cylindrical surface 174 may be provided a rotor element 176 that may be received about a rotor shaft 178 in such manner that the rotor is capable of revolving relative to the shaft. The space between the cylindrical wall 174 and the rotor may be defined as the annulus, and the annulus may be separated into four variable volume pumping chambers A, B, C and D by a plurality of vane elements, one being illustrated generally at 188.

Each of the vane elements 188 may include a generally cylindrical base portion 190 that may be received within a generally cylindrical receptacle 192 in such manner that the base portion is freely rotatable but closely fitting within the receptacle. Each of the vane elements may also include a substantially flat portion 194 defining bearing and sealing surfaces 196 and 198 that may be of flat configuration if desired or, in the alternative, may take any other suitable configuration such as described above in connection with FIGS. 1-4.

Within the rotor element 176 may be provided a plurality of bearing pad sockets, each being defined by a generally cylindrical surface such as shown at 200 with the bearing pad pockets being related to the outer generally cylindrical peripheral surface 202 of the rotor 176 in such manner as to form vane movement openings defined by opposed vane abutment lips 204 and 206.

Bearing pad elements 208 and 210 may be positioned in pairs within the respective pockets in closely fitting and movable relation with the cylindrical surface 200 defining the respective pocket. The outer surface of the respective pads may be generally cylindrical, as shown at 212 and 214, or in the alternative may take any other suitable form as is determined to be convenient. Bearing surfaces 216 and 218 may be defined on the inner periphery of each of the vane elements with the bearing surfaces being disposed for intimate load-carrying relationship with the respective substantially flat portion 194 of the vane element disposed therebetween. Here again, the bearing surfaces 216 and 218 may be of any suitable configuration that has intimate surface engagement with the surface configuration of the sealing surfaces 196 and 198 of the vane elements.

Housing structure 172 may be formed in such manner as to define a pair of inlet plenums 220 and 222 that may be in communication with the central chamber of the housing by means of check valves such as shown at 224, the check valves being depicted simply by arrows that are located within flow ports and are positioned to directionally indicate the flow of fluid between the plenum chamber and the central chamber of the pump. Likewise, the pump housing 172 may be provided with a pair of discharge plenums 226 and 228 that are also communicated with the central chamber of the pump by means of a plurality of discharge check valves 230 that are also represented by directionally oriented flow arrows. Any suitable check valve structure, such as that illustrated in FIG. 7, may be utilized for the inlet and discharge check valves represented by the flow arrows in FIG. 5.

Referring now to FIG. 6, the shaft 178 may be an eccentric portion of a larger shaft 232 with the eccentric portion 178 being of approximately the same length as the thickness of the rotor element 176. The outer extremity of the shaft 232 may be received within a blind bore 234 formed in the hub portion 236 of a housing plate 238. A second housing plate 240, like plate 238, being connected to the housing structure 172 by bolts or by any other suitable means of connection, may also be provided with a hub portion 242 having a bore 244 formed therein which receives a portion of the shaft 232.

Upon rotation of the shaft 232 relative to the housing and housing plates, the eccentric portion 178 of the shaft will move in circular manner about the axis of shaft 232. This will cause the rotor element 176 to have an essential rolling-like motion about the internal cylindrical surface 174 of the housing. The rotor element in mechanical function actually oscillates in circular manner about the axis of shaft 232, the circular movement being described by the circular movement of the eccentric portion 178 of the shaft.

Assuming the shaft to be rotating counterclockwise along with the rotor, counterclockwise oscillation of the rotor will occur as shown in FIG. 5 by movement arrow 246. The rotor and vane elements will take on the position illustrated in FIG. 5 at one point during each revolution of the pump. As this movement continues, variable volume chamber D will be expanding, while chamber A will be contracting. Chamber B will have expanded to its approximate greatest limits, as will have chamber C, but chamber B will begin to decrease in dimension while chamber C will still be expanding. Fluid that may have been drawn from inlet plenum 220 through check valve 224 into the chamber A will have been compressed and will be forced through the check valve 230 into the exhaust plenum 226 in a pressurized form for flowing to a suitable discharge conduit. Pumping chamber B, having expanded to its greatest volume and drawing fluid from inlet plenum 222 through the inlet check valve 224 will be decreasing in size, and the fluid entrapped therein will begin to be compressed and will begin flowing through the check valve 230 and to the discharge plenum 226. As the shaft 232 continues to rotate, the chambers will continuously change in dimension, either drawing fluid into the respective chambers through certain ones of the check valves or discharging fluid into one of the discharge plenums through certain ones of the discharge check valves.

Housing structure 172 may, for example, be a cast object with both the inlet and discharge plenums either cast or machined therein. As shown, the housing is bored in four places along the inner diameter thereof at 90° intervals to accept the vane elements. The thickness of the housing will be approximately the same dimension as the length of the vane elements, the bearing pads and the inner rotor element 176. The cavities defining the plenum chambers will serve as inlet and discharge plenums for the introduction of fluids into the pocket and collection of the compressed fluids therefrom. The two inlet ports will be interconnected by means of a cast or machined passageway, not shown. Likewise, the discharge ports must also be interconnected in this manner. Each inlet port and each discharge port will be fitted with an inlet check valve and discharge check valve respectively to control the direction of flow of fluids being pumped. The housing 172 may also be provided with a base portion 173 serving as a rest for the pump structure. The base portion of course may be provided with bolt apertures to enable the pump to be positively affixed to any suitable support therefor.

The vane elements and the rotor will have a very close fitting relationship with the head plates 238 and 240 in order to permit only a limited but acceptable amount of leakage past the vane elements and rotor during the pumping operation. The check valves may conveniently take the form of "ball-type" or similar type valves inserted in the housing structure to permit flow into the pockets on the suction stroke and to prevent outward flow during compression. The outlet check valves may also be of the ball check type but will close on the suction stroke and open on the compression strokes so as to allow discharge of fluid from the pumping chamber into the discharge plenums. The number and size of the inlet and discharge check valves will vary in accordance with the number and size of the pumping chambers incorporated into the pump mechanism. Although only four chambers are shown in FIG. 5, it is intended that any suitable number of chambers may be effectively employed without departing from the spirit and scope of the present invention.

For a thorough explanation of the operational concept of the pump mechanism illustrated in FIGS. 5 and 6, reference will be made to "A," "B," "C" and "D," which are the pockets or variable volume valve chambers formed between the housing element, the vanes and the rotor. A reference arrow R is also shown indicating the starting point of a single revolution of movement, with the various check valves serving the pumping chambers A, B, C and D being either open or closed as shown in chart form below.

As rotation proceeds counterclockwise from 0° to 45° from the reference arrow "R," chamber A will be decreasing in volume. The inlet valve in chamber A will be closed, and the discharge check valve in chamber A will be open, allowing the fluid to flow through the discharge check valve into the discharge plenum. The following chart illustrates a complete 360° rotational sequence with complete description of the various valve positions during each portion thereof;

| Position | "A" In | "A" Out | "B" In | "B" Out | "C" In | "C" Out | "D" In | "D" Out |
|---|---|---|---|---|---|---|---|---|
| 0° to 45° | C | O | C | O | O | C | O | C |
| 45° | C | C | C | O | C | C | O | C |
| 45° to 90° | O | C | C | O | C | O | O | C |
| 90° to 135° | O | C | C | O | C | O | O | C |
| 135° | O | C | C | C | C | O | C | C |
| 135° to 180° | O | C | O | C | C | O | C | O |
| 180° to 225° | O | C | O | C | C | O | C | O |
| 225° | C | C | O | C | C | C | C | O |
| 225° to 270° | C | O | O | C | O | C | C | O |
| 270° to 315° | C | O | O | C | O | C | C | O |
| 315° | C | O | C | C | O | C | C | C |
| 315° to 360° | C | O | C | O | O | C | O | C |

O = open
C = closed

The pump illustrated in FIGS. 5 and 6 can be varied substantially without departing from the spirit or scope of the present invention. The number of vane elements and corresponding bearing pads may be varied in the event it is desirable also to vary the number of pumping chambers with which the pump is provided. Moreover, the bearing pads and the bore in the housing structure may be designed as shown in FIGS. 1-4 with a slotted area behind the pad to accommodate the vane extension. Because the motion between the vanes and bearing pads is radial, and because the pump mechanism will not typically be subjected to any thrust along the axis of the shaft, the vanes may be modified to define radial grooves and/or ridges perpendicular to the base of the vane. The purpose of these ridges or grooves could be for achieving appropriate retention of lubricant in the area of the vanes and bearing pads to reduce the wear that is likely to occur during operation of the pump mechanism.

A pump mechanism constructed of the conventional sliding vane type pumping principle with vanes radiating from a center rotor relies on centrifugal force to maintain a sealing contact between the vane tips and the housing structure. When the differential pressure between the variable volume pumping chambers is high, there is a high flow rate from the high pressure pumping chamber to a pumping chamber of lower pressure, resulting in lower volumetric and overall operating efficiency at high pressures. The present pump design provides positive seal between the vanes and the housing structure which results in higher efficiencies through utilization of a broader working pressure range that is ordinarily available in conventional vane-type pumps.

Referring now to FIG. 7, the concept of the present invention may also be employed effectively in pumping mechanisms having a reciprocating type pumping motion. As shown in FIG. 7, a pump is illustrated generally at 250 having a housing structure 252 that is formed to define a central chamber 254. Within the chamber 254 may be located a rotor 256 having a bore 258 defined at the central portion thereof, which bore receives the eccentric portion 260 of a pump drive shaft similar to the pump shaft 232 shown in FIG. 6.

The rotor element 256 may be formed to define a plurality of pockets 262, each of which may receive the generally cylindrical base portion 264 of a reciprocating piston element 266. The base portion 264 of each of the pistons may be of generally cylindrical form and may be received in close fitting but movable and retained relationship within the respective pocket 262 of the rotor. The center line of the eccentric portion of the shaft is offset with respect to the center line of the shaft by a distance "e" that causes the rotor element 256 to oscillate in a circular manner within limits defined by radius "e." The pumping stroke of each of the pistons, therefore, will have a movement of distance equalling twice distance "e," as is evident from the drawings.

The housing element 252 is essentially a generally cylindrical component that is shown to be bored in eight places along its inner diameter with each of the bores defining opposed bearing pad support surfaces 266 and 268. A pair of bearing pads 270 and 272 may be positioned within each of the bearing pad receptacles with bearing surfaces 274 and 276 formed thereon in intimate engagement with the corresponding surfaces 266 and 268, respectively. Inner surfaces 278 and 280 defined on the respective bearing pads 270 and 272 may be positioned in spaced relation for sealing engagement with piston surfaces 282 and 284, respectively.

The housing structure may also be formed to define valve pockets that receive intake valve elements and exhaust valve elements, such as are illustrated generally at 286 and 288. An inlet valve and a discharge valve are associated with each of the piston elements and serve to control the flow of fluid both during suction and compression strokes of the respective pistons. A pair of the intake and exhaust valves are broken away and shown in section at the upper central portion of FIG. 7 with the inlet valve 286 being shown to have an inlet passage 290 in communication with an inlet plenum chamber 292. The check valve is shown to be a conventional ball check structure with a ball 294 being compressed against a valve seat by a compression spring 296. Likewise, the discharge valve 288 also includes a ball element 298 that is compressed against a tapered seat by a compression spring 300 and which is lifted from its seat during a compression stroke of the piston element to allow flow of compressed fluid from a pumping chamber through the discharge valve mechanism into a discharge plenum chamber 302. The inlet port 292 may be communicated with the atmosphere or with any suitable fluid medium that is to be pumped, while the discharge plenum chamber 302 may be communicated with any suitable discharge piping system for the purpose of transporting pressurized fluid medium from the pump.

As an alternative, the general characteristics of the structure may be reversed and the housing structure of the pump shown in FIG. 7 may conveniently take the form illustrated in FIGS. 5 and 6. The drive shaft 260 may be received by the housing structure in similar manner as shown in FIG. 6 if desired.

For purposes of explaining the operation of the pump mechanism shown in FIG. 7, reference will be made to pumping chambers A-H. These pumping chambers are defined by the cooperative relationship of the vanes and bearing pads with the housing structure 252 and its head plates or closure plates. Also, a reference arrow R' is shown to indicate a starting sequence for a single revolution of pumping movement of the pumping mechanism.

With rotation being counterclockwise and the vane element of pumping chamber A at its top dead center position, the discharge check valve of that respective intake and discharge valve assembly will have just closed. The inlet check valve related to valve chamber E will have just closed, and the vane element related to chamber E will be at its bottom dead center position. The vanes in pumping chambers B, C and D will be in various phases of compression strokes. The vane elements related to pumping chambers F, G and H will be in various stages of suction strokes. As rotation continues toward 45°, the vane element or piston related to valve chamber B will be approaching top dead center, and the vane or piston element related to valve chamber F will be approaching bottom dead center. At 45° of rotation, pumping chamber B will have its piston or vane element at top dead center, while pumping chamber F will be positioned with its piston at bottom dead center. This process will continue as rotation continues with the suction and discharge check valves opening and closing in sequence with the suction and compression strokes of each of the vane or piston elements.

With reference now particularly to FIG. 8, it is also desirable that the present invention relate to an energy transfer mechanism that may be utilized for the purpose of developing energy for transfer in rotary form to any suitable end use. As shown in FIG. 8, the invention may suitably take the form of an internal combustion engine illustrated generally at 306 that may include a housing structure 308 of generally circular form defining a central chamber 310. The housing 308 may be provided with head plates essentially of the form shown at 238 and 240 in FIG. 6. The head plates form side closures for the housing structure and serve to establish a substantially sealed relationship with rotor, vane and bearing pad elements located within the central chamber 310. The purpose of the engine illustrated at 306 is to convert a mixture of a combustible fluid medium and an oxidizer such as air into a rotational force for the purpose of driving rotary equipment.

The housing 308 may be of circular form, as shown in FIG. 8, and may be formed to define a pair of inlet manifold chambers 312 and a pair of exhaust manifold chambers 314. One intake valve and one exhaust valve will be associated with each of a plurality of variable volume combustion chambers that are defined within the central chamber 310, as will be discussed in detail hereinbelow. The wall structure of the housing 308 may be formed about the respective intake and exhaust apertures. Intake and exhaust valves 324 and 326, respectively, may be provided for mating relationship with the respective intake and exhaust valve seats and may be operated by valve stems 328 and 330 for movement of the intake and exhaust valves between the open and closed positions thereof. The valve stems 328 and 330 may be moved in any suitable manner, such as by engine-operated cams or hydraulic valve lifters to impart timed controlling movement to the intake and exhaust valves. As an example, a valve-controlling cam is shown at 332 for moving the exhaust valve 326 to its open position. A valve return spring 334 or any other suitable valve return device may be employed for moving the valve 326 to its closed position. Obviously, other types of valve actuating devices may be employed within the spirit and scope of the present invention.

It will be desirable to provide a plurality of combustion chambers that are capable of functioning in a designed sequence to cause operation of the engine responsive to combustion of a fuel and an oxidizer. This may be conveniently accomplished as shown in FIG. 8 by providing a rotor element 336 having a plurality of bearing pad receptacles 338 formed therein. Each of the receptacles 338 may take the form of a generally cylindrical bore defining a cylindrical surface 340 having intimate bearing engagement with bearing surfaces 342 and 344 formed on a pair of bearing pads 346 and 348, respectively.

The annular housing 308 may also be formed to define a plurality of vane base-retaining bores such as shown at 350 that serve to retain the generally cylindrical base portion 253 of a plurality of vane elements generally shown at 354. The vane elements 354 may each be provided with a partition portion 356 that may be of flat configuration if desired, defining bearing surfaces 358 and 360 that are maintained in intimate bearing engagement with bearing surfaces 362 and 364 formed on the bearing pads. The bearing surfaces 358 and 360 may have any suitable configuration that allows relative linear movement with the respective bearing surfaces 362 and 364.

The bearing pad pockets or receptacles 338 are formed to define openings through which the partition portions of their respective vanes extend. Likewise, the bores or receptacles 350 that receive the base portions of the respective vanes define openings through which the flat portions of the vanes extend. Angular movement of the vanes is therefore allowed within limits defined by surfaces 366 and 368 defined on either side of the respective openings. The vane elements may move into contact with either of the surfaces 366 or 368 during operation of the engine. Surfaces 370 and 372, defined on either side of the openings of the respective bearing pad receptacles, are capable of being contacted by the flat portions of the vanes.

For the purpose of achieving ignition, the housing structure 308 of the engine may be formed to define internally threaded sparkplug receptacles, such as shown in 374, into which a sparkplug 376 may be threaded with the sparkplug electrode 378 exposed within one of the variable volume combustion chambers. As the rotor element 336 is oscillated in circular manner within the chamber 310, the volume of each of the chambers will be varying, with some of the chambers increasing and others decreasing. The action of the rotor element is similar to that described above in connection with the pump illustrated in FIG. 6, with the exception that the rotor is driven by the expanding gases of fuel ignition within certain ones of the chambers rather than being propelled by a drive shaft. The shaft portion illustrated at 380 in FIG. 8 may be an eccentric portion of a drive shaft that is driven by the engine. The rotor element 336 imparts rotary force to the drive shaft 380 by oscillating within the chamber 310, thereby causing an output shaft of the engine to have rotary motion. This rotary motion may of course be utilized in any suitable manner.

As the rotor element oscillates, the vane elements 354 will pivot with respect to the housing structure 308 and with respect to the rotor element with the vanes maintaining movable but substantially gas-tight partitions between the respective combustion chambers of the engine. The bearing pads and the base portion of each of the vane elements will serve to stabilize the vane partitions during operation of the engine. As a combustion chamber expands, the inlet valve associated with that respective chamber will open, and a fuel-oxidizer mixture will be drawn from the inlet manifold 312 into the chamber. When the chamber has expanded to its greatest volume, the inlet valve will close, such as by a cam action, and the fuel-oxidizer filled chamber will begin to decrease in size, causing compression of the mixture. The exhaust valve will be closed at this particular time. After the chamber has decreased to a predetermined dimension, the sparkplug will be energized, developing a spark that ignites the mixture. The expanding gases will act against the rotor, the internal wall structure of the housing, and upon the partitions defined by vane partition elements at each extremity of the chamber involved in combustion. This internal pressure reacting against the vane partitions and the rotor will cause the rotor to move through a particular quadrant of its rotary movement. The chamber involved in in combustion will increase in dimension toward a maximum size and, upon reaching a predetermined dimension, the exhaust valve associated with that chamber will be opened, such as by cam action, and exhaust gases will flow from the chamber into the exhaust manifold where they will be transported away from the engine. The other chambers of the engine will be undergoing expansion and contraction at the same time and will be sequentially energized by combustion to cause the rotor element to complete one revolution of oscillatory movement.

It is important to note, however, that the basic features of the engine including the housing structure, the rotor element, the vanes and the bearing pads has substantially the same configuration and movement in the engine structure as compared with the pump structure illustrated in FIG. 8, for example.

With respect to engine operation, and referring to FIG. 8, rotary positions are established at each 90° quadrant of rotor oscillation. These positions are indicated by 0°, 90°, 180°, 270° and 360°. The following discussion will will describe the operation of a four-cycle gasoline fueled engine that is constructed in accordance with the present invention. The same design, however, could be employed for two-cycle engines and, with minor modifications, the engine structure illustrated in FIG. 8 may also be employed in diesel engines. Counterclockwise rotation is assumed, beginning at reference arrow R. As the shaft of the engine is rotated from 0° through 45°, the following sequence will take place:

Chamber "A"—Inlet and discharge valves are closed. The fuel/air mixture is being compressed (Compression Stroke).

Chamber "B"—The exhaust valve is open, permitting the combusted gas to escape.

Chamber "C"—The inlet valve is open and drawing in the fuel/air mixture.

Chamber "D"—Both valves are closed and combustion of the fuel/air mixture is taking place driving the inner element 336 toward the center and forcing the eccentric throw in a counterclockwise rotation.

45° to 135°

Chamber "A"—Both valves are closed. The sparkplug has ignited the fuel/air mixture near top dead center (45°) forcing the piston 336 toward the center the driving the drive shaft eccentric 380 in a counterclockwise rotation.

Chamber "B"—The exhaust valve remains open until the 135° position. At that point, it closes and the inlet valve opens.

Chamber "C"—At 45° the inlet valve closes, leaving both valves closed, and this chamber is in the compression stroke through the balance of this rotation phase.

Chamber "D"—Both valves are closed, and this chamber continues in its power stroke. When rotation reaches 135°, the inner element will be at bottom dead center and the exhaust valve will open.

135° to 225°

Chamber "A"—Both valves remain closed while this chamber remains in its power stroke until 225°. At 225°, the inner element 336 will be at BDC and the exhaust valve will open.

Chamber "B"—The inlet valve is open and the exhaust valve is closed, allowing in the fuel/air mixture.

Chamber "C"—Both valves remain closed while this chamber is in its compression stroke.

Chamber "D"—The exhaust valve is open, and the burned gases are exhausting to the discharge port.

225° to 315°

Chamber "A"—The exhaust valve is open, and the burned gases are exhausting to the discharge port.

Chamber "B"—The inlet valve remains open until the 315° point, at which time it closes.

Chamber "C"—With both valves closed, the sparkplug will ignite the compressed fuel/air mixture at approximately 225° or its TDC. This chamber is in its power stroke.

Chamber "D"—The exhaust valve remains open, allowing the burned gases to exhaust to the discharge port until 315° when the exhaust valve closes and the inlet valve opens.

315° to 45° or 315° to 405°

Chamber "A"—The exhaust valve remains open through this phase of rotation until the 45° or 405° position is reached. At that point, the exhaust valve will close and the inlet valve will open.

Chamber "B"—Both valves are closed, and this chamber continues in its compression stroke.

Chamber "C"—Both valves are closed, and this chamber continues in its power stroke through 405°, at which point it will be at BDC and the exhaust valve will open.

Chamber "D"—The inlet valve is open and fuel/air mixture is being drawn into the chamber.

This operational discussion has taken the reader through 405° of rotation, which is more than sufficient description of the operation, although not a complete two-revolution cycle. The firing order for this particular engine is "A," "C," "B," "D." The following will summarize a complete two-revolution cycle of the engine:

| Position | Chamber | | | |
|---|---|---|---|---|
| | "A" | "B" | "C" | "D" |
| 45° to 135° | Power | Exhaust | Compress. | Power |
| 135° to 225° | Power | Suction | Compress. | Exhaust |
| 225° to 315° | Exhaust | Suction | Power | Exhaust |
| 315° to 405° | Exhaust | Compress. | Power | Suction |
| 405° to 495° | Suction | Compress. | Exhaust | Suction |
| 495° to 585° | Suction | Power | Exhaust | Compress. |
| 585° to 675° | Compress. | Power | Suction | Compress. |
| 675° to 45° | Compress. | Exhaust | Suction | Power |

The engine structure illustrated in FIG. 8 may be modified within the spirit and scope of the present invention. The vanes and bearing pads may be mounted interchangeably in the rotor structure and the housing structure, if desired, and the number of vanes and bearing pad sets may be varied as desired to create more or fewer combustion chambers as is desired for engine design. Also, the vane elements need not be provided with flat surfaces but could be fitted with radial slots or grooves, since the misalignment encountered in this particular design will be limited to a single direction.

It may also be desirable to utilize the basic mechanical energy transfer mechanism of the present invention to absorb energy that is induced in rotary manner to an absorbing device. In accordance with FIG. 9, a rotary shock-absorbing device constructed in accordance with the principles of this invention may conveniently take the form shown generally at 382. The shock-absorbing mechanism may include a housing structure 384 within which may be defined a fluid chamber 386. The housing may also define an internal chamber 388 that may be divided into a plurality of variable volume chambers A, B, C and D by a plurality of partition vane elements illustrated generally at 390. Each of the partition vane elements may include a generally cylindrical base portion 392 and a flat wall portion 394. The base portion may be received within a generally cylindrical receptacle 396 that serves to establish a movable but locked relationship between the vane partition element and the wall structure of the housing. The receptacle 396 is so designed as to define an elongated opening having side surfaces 398 and 400, with the wall portion of the partition element extending through the opening and having pivotal movement relative to the housing within limits defined by the surfaces 398 and 400. The partition portion of the vane element may contact the surfaces 398 and 400 during operation of the shock absorber device.

Within the internal chamber 388 of the housing may be located a rotor element 402 having an aperture 404 located centrally thereof that receives the eccentric portion 406 of an energy-transmitting shaft. The rotor element 402 is also formed to define a plurality of bearing pad receptacles 408 within which may be located bearing pads 410 and 412 tht establish bearing engagement with the wall surfaces defining the respective receptcles. The flat portion 394 of the respective vane elements 390 may be received between the bearing pads 410 and 412 and may establish bearing engagement with bearing surfaces 414 and 416 formed thereon.

Each of the receptacles is formed in the rotor element so as to define an opening through which the partition portion 394 of the vane elements extends. Lip elements 418 and 420 defined on either side of the opening are spaced to such extent that considerable pivoting of the vane partition elements is allowed during oscillation of the rotor. The bearing pad elements 410 and 412, of course, rotate along with the vane elements while maintaining a bearing engagement and stabilizing the vane elements during operation of the shock absorber device. Likewise, the vane elements are capable of moving linearly relative to the bearing pads as the position of the rotor element changes during application of rotary energy to the shock absorber mechanism.

For the purpose of absorbing shock applied to the shock absorber, it is contemplated that a fluid transfer be accomplished between respective ones of the variable volume chambers A, B, C and D and the fluid transfer chamber 386. This fluid transfer may conveniently be accomplished by forcing fluid from the variable volume chambers through restricted orifices into the fluid-receiving chamber 386. One suitable device for controlling the flow of fluid may conveniently take the form of a plurality of flow control valves, one being shown generally at 422 which incorporates a valve body 424 having a threaded upper extremity that is received by the internally threaded outer portion of a valve bore 426. Since the bore 426 extends across the fluid-receiving chamber 386, a pair of annular sealing elements 428 and 430, such as O-rings or the like, may be received within seal grooves formed in the valve body 424. The sealing elements will serve to establish seals between the valve body and the wall structure defining the bore 426 on either side of the fluid-receiving chamber 386. A needle valve 432 may be threadably received within the valve body 424 and may be formed to define a needle element 434 that restricts the flow of fluid through a flow passage 436 defined within the valve body. Transverse passages 438 serve to communicate fluid from within the valve body structure 424 to the fluid-receiving chamber 386. The needle valve 432 may be adjusted as is desired to control the rate of flow through the flow passage 436 at any particular pressure.

To absorb shock that is transmitted in rotary manner to the shock absorber 382, the shock absorber housing 384 will be stabilized with respect to one mechanical structure, while the rotor element and its shaft will be firmly affixed to another mechanical structure, it being desired to absorb rotary forces that are transmitted between the mechanical structures. As the rotor begins its rotation responsive to forces induced by one of the mechanical devices, the rotor will have a circular oscillational movement within the central chamber 388. The shock-absorbing chambers A, B, C and D will vary in size during oscillation of the rotor, and fluid within each of the variable volume chambers will be forced through the needle valve structure causing substantial absorption of the energy of the fluid as it flows across the restriction of the needle valve. As the chambers increase in size, during rotation of the rotor, fluid, such as hydraulic fluid for example, will be drawn into the respective chambers through the respective needle valve structures from the fluid chamber 386. As the chambers decrease in size, fluid entrapped within the chambers by the partitions will be caused to flow through the needle valve structure into the fluid-receiving chamber 386 with force-absorption taking place.

It is important to note, however, that the basic mechanical movement of the shock-absorbing system illustrated in FIG. 9 is substantially the same as the basic mechanical movement of the rotor, partition vanes and bearing pads illustrated in the internal combustion engine of FIG. 8, the pump of FIG. 5 or 6, and the coupling of FIGS. 1 and 2. The present invention, therefore, is readily adaptable to many different types of mechanical devices utilizing the same basic principles of mechanical movement.

When the fluid medium is a compressible fluid, such as air, the device will absorb shock by compressing that particular medium in the variable volume chambers, thus resisting the rotational force that is applied through the shock absorber device. When non-compressible fluids such as hydraulic oil are utilized, the shock absorber will function in such the same manner as the compression of gases, but will typically have a much shorter response time. When air or other gases are utilized, the flow between the chambers can actually be eliminated by rendering the control valve inoperative. When non-compressible fluids are utilized, the device will function as a brake if the control valve is closed.

Although the shock absorber mechanism is illustrated with the vanes being connected to the outer housing and being supported by bearing pads that are carried by the rotor, it is not intended to limit the invention to this particular structure. By reversal of parts, the bearing pads may be supported by receptacle formed in the outer housing structure, and the vane elements may be pivotally connected to the rotor.

The mechanical structure of the present invention is illustrated in FIGS. 1, 2, 3 and 4 in the relaxed or unloaded position thereof. In FIG. 10, the loaded position of these structures is depicted. The mechanical structure illustrated in FIG. 10 may conveniently take the form of a coupling having an outer housing structure 440 having a plurality of vane base support receptacles 442 formed therein. The receptacles 442 are formed in the housing structure in such manner that a plurality of openings are defined through which extends the substantially flat portion 444 of a vane element illustrated generally at 446. The generally cylindrical wall structure of each of the receptacles 442 define bearing support for the cylindrical base portion 448 of the vane element.

A rotor element 450 is formed to define a plurality of generally cylindrical or spherical bearing pad pockets 452 within which may be received pairs of bearing pads 454 and 456. The flat portion 444 of each of the vane elements is positioned between bearing surfaces 458 and 460 defined on the respective bearing pads, and forces received by the bearing pads are transmitted through these surfaces to the vane elements and through the vane elements to the outer housing structure. Logically, forces transmitted to the outer housing structure may be transmitted through the vane elements and bearing pads to the rotor 450, depending upon the particular energy transfer that occurs. The shaft 462 is received within an aperture 464 formed centrally of the rotor 450, and the rotor will have no movement relative to the shaft.

The respective bearing pad receptacles 452 formed in the rotor element 450 form angular openings defining opposed force-transmitting surfaces 466 and 468, thus allowing substantial angular movement of the respective vanes and bearing pads relative to the rotor. In the loaded condition, one of the force-transmitting surfaces 466 or 468 is in contact with the substantially flat surface of one of the vane elements 446. As shown in FIG. 10, the vane-engaging, force-transmitting surface 466 at the lowermost portion of FIG. 10 is shown to be in engagement with the flat portion 444 of the vane element. Thus, forces induced to either the vane element or the outer housing structure may be transmitted through the vane element to either the rotor or the outer housing structure as the case may be. If a rotational force is transmitted through the shaft to the rotor element 450, the rotor, upon moving to the position illustrated in FIG. 10, causes surface 466 to engage the flat portion 444 of the vane element. Force is thus transmitted from the rotor to the vane element and, because of the pivotal bearing connection between the base portion 448 of the vane element and the vane receptacle 442, that same force will be transmitted from the vane element into the outer housing structure of the rotor.

The energy-transmitting mechanism of the present invention may conveniently take forms other than that illustrated particularly in FIGS. 1–10 without departing from the spirit or scope of the present invention. As shown in FIG. 11, the energy transfer mechanism may conveniently take a modified form that essentially changes only the relalationship of the vane elements to the outer housing structure. This particular structure is limited, however, in that it can be utilized only when parallel misalignment is involved, such as described above in connecton with the the coupling structure of FIGS. 3 and 4, the pump devices of FIGS. 5 and 6, the engine mechanism of FIG. 8 and the shock absorber system of FIG. 9. It would appear that the primary application of the structure illustrated in FIG. 11 would find its most convenient form in torque-transmitting devices since it distributes the rotational forces more evenly as compared to the other mechanical structures described above. When utilized as a pumping device or any of the devices where bearing pad receptacles are required for its operation, a positive seal is not formed between the vane element and the outer housing structure. The particular groups represented by this structure will vary, depending upon the function or application in which it finds its use. It should be noted that FIG. 11 does not illustrate a keyway and key fixing the relative position of the shaft 482 and the rotor 480. This fixed relationship would be essential to the coupling illustrated in FIGS. 3 and 4, whereas the shaft and rotor relationship illustated in FIG. 11 would be necessary for the eccentric shaft devices described in FIGS. 5, 6, 8 and 9.

Referring now particularly to FIG. 11, the energy-transmitting mechanism shown therein generally at 470 may include an outer housing structure 472 defining an inner chamber 474. The internal wall structure of the outer housing structure may be conveniently formed to define a plurality of partially cylindrical surfaces 476. The chamber 474 will be closed by means of closure plates or head plates such as illustrated at 94 and 96 in FIG. 4, for example, one of such head plates being shown at 478.

A rotor element 480 may be movably received within the chamber 474 and may be rotatably connected to the eccentric portion 482 of a drive or driven shaft, with the eccentric portion of the shaft being received within a central opening 484 formed in the rotor element. The rotor element may also be formed to define a plurality of bearing pad receptacles 486 within which may be received bearing pads 488 and 490 that have a bearing relationship with the generally cylindrical bearing surface defining each of the receptacles 486. The bearing pads may be formed to define substantially flat internal bearing surfaces 492 and 494 that have bearing engagement with bearing surfaces 496 and 498, respectively, defined on a vane element 500.

Each of the vane elements may be received within depressions formed in the respective head plates so that the vane elements are encapsulated and have limited movement defined by the respective head plates. The extremities of the vane elements also may have a substantially sealing relationship with the internal head plate surfaces for the purpose of providing a substantial seal during operation of the energy transfer mechanism.

In the event it is desirable to form the internal chamber 474 of the mechanism into a plurality of fluid-containing chambers such as shown at A, B, C amd D, the end portions of the respective vane elements 500 will have substantial sealing engagement with the head plates. Likewise, surfaces 502 defined on the vane elements will have substantial sealing engagement with the partially cylindrical surfaces 476 defined by the internal wall structure of the outer housing 472. Likewise, the vane elements 500 will have substantial sealing engagement with the bearing surfaces 492 and 494 of the bearing pads, and the bearing pads will also have substantial sealing engagement with the cylindrical surfaces 486 of the respective bearing pad receptacles. The variable volume chambers A, B, C and D will therefore serve as pressure-containing or pressure-inducing chambers in the event the mechanism is utilized to define a fluid pressure-responsive or fluid pressure-inducing mechanism such as a pump, an internal combustion chamber, a compressor, a rotory shock absorber, etc.

As the rotor element 480 is rotatably moved within the housing structure to define a rotary oscillation movement, the vane-type partition elements 500 will maintain a juxtaposed relationship with the respective partially cylindrical surfaces 476. As the rotor element rotates in oscillatory manner within the chamber 474, there will be relative linear movement between the vane partition elements and the bearing surfaces 492 and 494 of the respective bearing pads. Some of the variable volume chambers A, B, C and D will be decreasing during oscillation of the rotor, while others of the chamers will be increasing. Energy transfer through the mechanism may conveniently be responsive to increase or decrease in the volumetric dimension of the chambers or may be responsive simply to force transfer through the vane partition elements between the rotor and the housing structure. The vane elements, rather than rotating about a base structure as shown in FIGS. 1-10, will have a materially different mechanical movement. The vane will be rotated about its center axis while maintaining substantial contact with the partially cylindrical surfaces 476 throughout the various positions of movement as the rotor is oscillated within the internal chamber 474 of the housing. Depending upon the character of use to which the energy transfer mechanism is put, the shaft structure 482 may take the form of an eccentric portion of a shaft that is movably related to the rotor or, in the alternative, the shaft may be keyed to the rotor, depending upon the particular characteristics of the energy transfer that is desired.

Referring now to FIGS. 12, 13 and 14, there is illustrated a mechanical coupling structure or universal joint having the purpose of transmitting a rotational force from one shaft to another. The particular mechanical coupling design illustrated in these figures is effective to permit severe angular misalignment of the respective shafts. The basic energy transfer structure incorporating an outer housing, an inner movable element and vane elements transmitting energy between the internal and external portions of the coupling structure is maintained, but two major differences occur. First, the vane elements are fixed, and secondly, the bearing pads are mounted with their axes radial to the axis of the shaft to which they are coupled rather than being parallel to the drive shaft as is illustrated in FIGS. 1-11.

Referring now to FIGS. 12, 13 and 14, the coupling illustrated generally at 504 includes an outer annular housing 506 that may be of generally cylindrical external configuration and which is formed internally thereof to define a partially spherical cavity or chamber defined by a partially spherical surface 508. The housing structure 506 may be formed to define a pair of opposed slots 510 and 512 that receive vane elements 514 and 516, respectively. The vane elements may comprise substantially flat plates defining opposed smooth, substantially flat surfaces, such as shown at 518 and 520. The vane elements may also be formed to define curved internal surfaces 522 and 524, as shown in FIG. 13.

The housing structure may also be defined by a drive plate 526 that may be secured to the annular housing element 506 by bolts or by any other suitable means of connection. The drive plate may be provided with a central hub portion 528 that may be bored, as shown at 530, to receive a drive shaft 532. A drive key 534 may be contained within keyways defined both in the drive shaft and in the hub portion of the drive plate, thereby locking the shaft and drive plate in non-rotatable relation.

An inner force-transmitting element 536 may be provided having a bore 538 formed centrally thereof and adapted to receive a driven shaft 540. A key 542 may be retained within keyways defined in the inner force-transmitting element and shaft to lock the shaft in substantially non-rotatable relation to the inner force-transmitting element. Opposed extremities 544 and 546 of the inner force-transmitting element may be formed to closely interfit with the generally spherical internal surface 508 of the housing 506 and to retain this closely interfitting relation as the inner force-transmitting element is angularly oriented with respect to the housing structure by the position of the driven shaft 540. The opposed extremities of the inner force-transmitting element may also be formed to define bearing pad receptacles 548 and 550, within which may be received pairs of bearing pads such as illustrated at 552 and 554. The bearing pads may define internal bearing surfaces 556 and 558 that have bearing engagement with the opposed flat surfaces of the vane elements that are disposed between the spaced bearing pads. As the internal force-transmitting element 536 is moved in pivotal manner relative to the housing structure 506, the opposed bearing pads will have a sliding movable relationship with the respective vane elements and will maintain sufficient surface contact with the vane elements to serve a force-transmitting function, either transmitting forces to or receiving forces from the vane elements, by virtue of the interconnection of the vane elements in the connection.

The coupling structure illustrated in FIGS. 12, 13 and 14 makes effetive use of the basic principles of the present invention, including an outer structural element, an inner movable element and cooperating bearing pads and vanes that serve as force-transmitting elements between the inner and outer structural elements of the coupling. The association of the bearing pads with the vane elements provides a greater angular misorientation between the drive and driven shafts than is ordinarily acceptable in coupling devices. The bearing pads, being of generally semi-cylindrical configuration and being received within mating, generally cylindrical bearing pad receptacles and having substantially flat inner surfaces that are engaged by substantially flat surfaces formed on the vane elements, allow a unique universal coupling movement to occur while at the same time maintaining efficient surface area contact for optimum force transmission through the coupling structure. Also, the cooperative relationship between the outer partially spherical surfaces 544 and 546 of the inner force-transmitting element will be only slightly smaller than the internal dimension of the spherical housing surface 508. This close-fitting relationship prevents any undesirable vibrational movement to occur as the universal coupling is rotated.

For the purpose of facilitating an understanding of the relationship of the various parts, the following mechanical movement will occur during operation of the universal coupling: The axes of the drive shaft and driven shaft will always intersect each other at the center of the spherical curvature of the inner diameter of the outer housing structure. The rotational force will be transmitted from the inner structural element to the vanes through the bearing pads. To aid in the description of operation through one complete revolution, the bearing pads closest to the viewer in FIG. 12 will be referenced as "A," and those farthest away as "B." Rotation will be such that bearing pads A will rotate upward, and pads B will rotate downward, as the mechanical movement is initiated.

0°–90°—As rotation is initiated, bearing pads A will be sliding away from the center of the outer element or housing toward the drive shaft, side 540 of the coupling structure. Conversely, bearing pads B will be sliding off center to the driven shaft 532 side of the coupling.

90°–180°—At the 90° position, the view will be as illustrated in FIG. 14, but with the drive shaft 540 at the angle shown in FIG. 12, with bearing pads A in the top position. As the rotation continues toward 180°, bearing pads A will slide back toward the center of the outer housing structure, as will bearing pads B. At 180°, the position will appear as in FIG. 12, but with bearing pads A furtherest from the viewer and B closest to the viewer.

180°–270°—Bearing pads A will slide away from the center toward the driven shaft side 532 of the outer housing structure. Bearing pads B will be sliding on the vanes toward the drive shaft 540 side of the outer housing. At the 270° position, the view will be as as shown in FIG. 14 but with the drive shaft 540 at the angle shown in FIG. 12 with bearing pads A being positioned at the bottom and bearing pads B positioned at the top.

270°–360°—The bearing pads will be sliding toward the center of the outer housing structure with the final position at 360° being as shown in FIG. 12, with bearing pads A being closest to the viewer. Relative rotation of the inner element to the bearing pads will take place throughout the entire rotational cycle of the coupling structure.

The outer housing structure is shown as a single integral element. With this design, the inner force-transmitting element 536 necessarily cannot be a complete circle, since it would be impossible to insert it into the generally cylindrical receptacle defined by the housing structure. Obviously, the universal joint may be driven from either of the shafts 532 or 540, and therefore it is not intended to limit one of the shafts to a drive shaft and the other to a condition of being driven. The drive shaft and the inner force-transmitting element 536 may, if desired, be a single integral element. Likewise, the driven shaft and its drive plate may be of integral design, if desired.

The same general mechanical structure illustrated in FIGS. 12–14 and incorporated into a coupling mechanism may also be conveniently utilized to define a pumping system, as shown in FIGS. 15, 16 and 17. FIGS. 15–17 illustrate a pumping device having the purpose of pumping liquids or fluids by means of increasing and decreasing pockets or chambers A and B. The structure utilized in a pumping device of this nature takes the same general form as that utilized in the universal joint of FIGS. 12–14, with modifications that facilitate utilization of the device for the purpose of pumping. The pump mechanism illustrated generally at 568 may define a housing structure 570 that is formed internally thereof so as to define a pump chamber 572. An inner pump housing 574 may be received within the chamber 572 and may be retained within the chamber by means of a housing cover 576. The inner pump housing may be of generally cylindrical external configuration and may be formed internally thereof so as to define a generally spherical internal surface 578 forming a cavity 580 of partially spherical configuration. A head plate 582 may also be received within the pumping chamber of the housing and may be positioned in intimate engagement with the inner pump housing 574.

For the purpose of creating a pumping action, a movable inner pump element 584 may be provided which may be of circular configuration. The inner pump element 584 may function as a piston that causes variation in the volume of chambers A and B as relative movement occurs between the inner pump element and the inner housing structure 574. The curvature of the perimeter of the inner pumping element has a radius equal to the internal dimension of the partially spherical surface 578 of the inner pump housing 574. The radius is equal to the internal dimension of the spherical surface 578 in two planes, i.e., parallel and perpendicular to its axis, forming a spherical curvature. At 180° points, perpendicular to its axis, the inner pumping element 584 is bored at two locations such as shown at 586 to define bearing pad receptacles, each receiving opposed pairs of bearing pads 588 and 590. The base or bottom of this bore is shown as having a continuation of the spherical surface of the domed area 575. The purpose of this surface is to maintain a seal between itself and the internal dimension of the vane 592 and the base of the bearing pad which prevents the fluids being pumped from escaping the chambers A and B. A domed spherical surface 575 exists on the front side (opposite the shaft). This surface has a radius equal to the internal dimension of the vanes and dished impression in the head plate 582, and shares the same center as these radii. This surface forms a seal between itself and the vanes 592 and the head plate 582 to prevent leakage betweeen chambers A and B. Finally, the inner pumping element is bored along its axis to accept a drive shaft 594 and keyed or otherwise secured to form a non-rotatable relationship between these elements.

Each of the vane elements 592 may consist of substantially flat elements defining smooth opposed force-transmitting surfaces with an inner curvature with a radius and center equal to that of the domed portion of the inner pumping element 584. This curvature must have the same radius in two planes (parallel and perpendicular to the vane). This is necessary to form a seal between the vanes and the inner pumping element 584. The length of the vane elements is greater than the pump housing element 574 and extends into a groove in the head plate 582. It should be noted that a single vane with a continuous curvature at the head plates end can be utilized. This would eliminate the need for the dished-shaped curvature at the head plate.

The bearing pad elements 588 and 590 are of generally semi-cylindrical configuration and are related to the bearing pad receptacle 586 so as to define a space to receive the vane element 592. The base portion of each of the pads includes a dished, spherical curvature on the inner side thereof to form a seal to prevent leakage out of the pumping chambers A and B. The head plate 582 is a generally circular shaped element that is fixed to the pump housing element 574. The head plate may be slotted to accept the vanes, as shown. The head plate may also be bored at 180° opposed locations 585 to provide slots that serve as inlet and discharge ports, allowing fluid to enter and exit the chambers A and B. The head plate may be formed to define a spherical concave surface machined on the inner surface thereof. The concave surface 587 has a radius equal to that of the dome 575 on the inner element 584.

The outer housing structure 570 houses the rotating portion of the pump structure, including 574 and 582. The housing may be formed to define grooved sections (shown by dotted lines in FIG. 17), machined on the inside flat surfaces thereof, which serve as collection channels for the fluid entering and leaving chambers A and B. The housing may also be drilled and tapped with inlet and discharge connections that communicate with the collection channels. The cover plate 576 of the housing structure is a substantially flat plate having a central aperture 596 formed therein. The drive shaft 594 extends through the aperture 596 and, because of the size of the aperture, has ample room for substantial pivotal movement relative to the cover plate 576 without causing any interference whatever. The cover plate functions to limit the axial motion of the rotating assembly defined by elements 574, 582 and 584.

For the purpose of facilitating an understanding of the pumping movement that occurs during operation of the pump mechanism shown in FIGS. 15-17, a pumping sequence is described hereinbelow. For purposes of describing the pumping action, it will be assumed that rotation of the drive shaft 594 is counterclockwise as the viewer faces FIG. 17.

0°-180°—At the 0° point of rotation, as shown in FIGS. 15, 16 and 17, chamber A is at its maximum volume, and chamber 8 is at its minimum. As rotation begins, the port in chamber A is exposed to the discharge channel, and the port in chamber B is exposed to the inlet channel. Simultaneously, the volume of chamber A begins to reduce, causing the fluid in chamber A to flow through the port to the discharge channel. Conversely chamber B will be increasing in volume and drawing fluid into chamber B from the inlet port. This process continues until the 180° point, or after one-half cycle of rotation. At this point the ports will be in the same position as shown in FIG. 17. But chamber A will now have minimum volume, and chamber B will be at its maximum. Flow into or out of either chamber will not occur at this point because the grooves and channels are not aligned.

180°-360°—The mechanical movement occurring during rotation from 0° to 180° reverses itself through the second phase of rotation. Chamber A increases in volume, and chamber B is in the process of decreasing. Otherwise, the mechanical movement in that occurs is the same as is described above in connection with rotation from 0° through 180°.

A pump mechanism of the form illustrated in FIGS. 15-17 includes no valves and therefore has no valve power losses. Volume of the pumping mechanism is variable from zero flow to maximum flow by varying the angle of the drive shaft relative to the axis of the outer pumping element 574. The valve structure is also of extremely compact design and is quite efficient from the standpoint of savings in space. The valve structure is also capable of reversible flow that may be effectively achieved simply by reversing rotation of "flipping" the shaft and driving from the other side of the axis of the outer pumping element 574.

Any of the devices illustrated using the eccentric shaft (swinging vane) structure may have a reverse torque effect that cold cause a rotary oscillating effect on the inner structural element that could be undesirable. The mechanical devices that might be adversely affected by reverse torque are the pump of FIGS. 5 and 6, the pump of FIG. 7, the engine of FIG. 8 and shock absorber structure of FIG. 9. Where the vanes mount on the inner structural element, as in FIG. 7, the reverse torque effect can be eliminated by mounting one of the vanes fixed in a position with its radial axis running through the axis of the center bore. This structure might conveniently take the form illustrated in FIG. 18. Likewise, where the vane elements are mounted on the outer housing structure rather than on the rotor, this problem could be countered by designing a projection on the outer perimeter of the rotor element that is received within appropriate grooves defined by the inner periphery of the housing structure. This arrangement could conveniently take the form illustrated in FIG. 19.

Also, it should be borne in mind that the pumping structure illustrated in FIGS. 15–17 could, without any change in structural detail, function as a hydraulic motor. This could be accomplished by connecting a fluid supply to one connection and a return line to the other. To maintain the same rotation as described in the pump discussion, the fluid supply source could be connected to the inlet connection and the return to the discharge connection. The speed of the motor could be varied by changing the flow rate of the supply or the angle of the drive shaft. The rotation can be varied by changing the fluid supply source to the discharge connection.

It is clear from this specification that the present invention may take many different forms within the spirit and scope thereof. By slight modifications, the invention serves many different mechanical purposes and yet, in each case, utilizes the same basic mechanical principles.

Having thus fully described my invention, I claim:

1. A rotary oscillatable energy-transmitting mechanism in the form of a universal coupling, and comprising:

a housing structure defining an outer force-transmitting element and being formed to define an inner surface of at least partially spherical configuration defining a shaft opening and an internal receptacle;

an inner force-transmitting element being located within said housing and being movable relative to said housing, said inner force-transmitting element being formed to define opposed, at least partially spherical external surfaces for mating engagement within said partially spherical inner surface;

an energy-transmitting shaft being connected to one of said inner and outer force-transmitting elements;

a plurality of bearing pad receptacles being defined by one of said inner and outer force-transmitting elements, said bearing pad receptacles defining internal generally cylindrical surface means and being positioned in opposed relation;

a pair of bearing pads being received by each of said bearing pad receptacles, said bearing pads having generally cylindrical external surfaces having mating engagement with the generally cylindrical surface means defining said receptacles, said bearing pads also being formed to define opposed generally planar bearing surfaces;

a plurality of rigid energy transfer vane elements being located in opposed relation and being immovably related to one of said inner and outer force-transmitting elements, said vane elements being interposed between said bearing surfaces and being in bearing engagement with at least one of said bearing surfaces;

said bearing pads and vane elements sliding one relative to the other upon oscillation of said inner force-transmitting element;

an input shaft being non-rotatably connected to one of said housing structures and said inner force-transmitting element and an output shaft being non-rotatably connected to the other of said housing structure and said inner force-transmitting element; and one of said input and output shafts extending through said shaft opening and being of substantially smaller dimension than the dimension of said shaft opening to allow substantial axial misalignment between said input and output shafts.

2. A rotary oscillatable energy-transmitting mechanism as recited in claim 1, wherein:

said housing structure is formed to define internal opposed slot means; and said vane elements being at least partially received within said opposed slot means and establishing a non-rotatable relationship between said housing and said inner force-transmitting element.

* * * * *